(12) United States Patent
Tabarovsky et al.

(10) Patent No.: US 7,421,345 B2
(45) Date of Patent: *Sep. 2, 2008

(54) GEOSTEERING IN EARTH FORMATIONS USING MULTICOMPONENT INDUCTION MEASUREMENTS

(75) Inventors: Leonty A. Tabarovsky, Cypress, TX (US); Michael B. Rabinovich, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/744,702

(22) Filed: May 4, 2007

(65) Prior Publication Data

US 2007/0219723 A1  Sep. 20, 2007

Related U.S. Application Data

(63) Continuation of application No. 11/072,570, filed on Mar. 4, 2005, now Pat. No. 7,274,991, which is a continuation-in-part of application No. 10/934,596, filed on Sep. 3, 2004, now Pat. No. 7,031,839, and a continuation-in-part of application No. 10/867,619, filed on Jun. 15, 2004.

(51) Int. Cl.
G01V 1/04 (2006.01)
G06G 7/48 (2006.01)

(52) U.S. Cl. .............................. 702/9; 703/5

(58) Field of Classification Search ............... 702/1–16; 703/1–5; 334/339
See application file for complete search history.

(56) References Cited

U.S. PATENT DOCUMENTS

| 4,837,517 A | 6/1989 | Barber ..................... 324/339 |
| 5,157,605 A | 10/1992 | Chandler et al. ............. 364/422 |
| 5,329,448 A | 7/1994 | Rosthal .................... 364/422 |
| 5,452,761 A | 9/1995 | Beard et al. ................. 166/250 |
| RE35,386 E | 12/1996 | Wu et al. ..................... 175/45 |
| 5,656,930 A | 8/1997 | Hagiwara ................... 324/339 |
| 5,666,057 A | 9/1997 | Beard et al. ................. 324/339 |
| 5,703,773 A | 12/1997 | Tabarovsky .................. 702/7 |
| 5,781,436 A | 7/1998 | Forgang et al. ............. 364/422 |
| 5,884,227 A * | 3/1999 | Rabinovich et al. ............ 702/7 |
| 5,999,883 A | 12/1999 | Gupta et al. .................. 702/7 |
| 6,092,024 A | 7/2000 | Wu ............................ 702/7 |
| 6,147,496 A | 11/2000 | Strack et al. ................ 324/343 |
| 6,163,155 A | 12/2000 | Bittar ....................... 324/338 |
| 6,219,619 B1 | 4/2001 | Xiao et al. .................... 702/7 |
| 6,308,136 B1 | 10/2001 | Tabarovsky et al. ............. 702/7 |
| 6,393,364 B1 | 5/2002 | Gao et al. .................... 702/7 |

(Continued)

*Primary Examiner*—John E Barlow, Jr.
*Assistant Examiner*—Victor J. Taylor
(74) *Attorney, Agent, or Firm*—Madan, Mossman & Sriram, P.C.

(57) ABSTRACT

A multicomponent induction logging tool is used on a MWD bottomhole assembly. Multifrequency focusing that accounts for the finite, nonzero, conductivity of the mandrel is applied. Using separation of modes, the principal components and a direction of a conductivity tensor are determined. The results are used for reservoir navigation in earth formations. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or meaning of the claims. 37 CFR 1.72(b)

23 Claims, 11 Drawing Sheets

U.S. PATENT DOCUMENTS

| | | | |
|---|---|---|---|
| 6,400,148 B1 | 6/2002 | Meyer et al. | 324/303 |
| 6,466,872 B1 | 10/2002 | Kriegshauser et al. | 702/7 |
| 6,553,314 B2 | 4/2003 | Kriegshauser et al. | 702/7 |
| 6,556,016 B2 | 4/2003 | Gao et al. | 324/343 |
| 6,574,562 B2 | 6/2003 | Tabarovsky | 702/7 |
| 6,636,045 B2 * | 10/2003 | Tabarovsky et al. | 324/343 |
| 6,643,589 B2 | 11/2003 | Zhang et al. | 702/7 |
| 6,760,666 B2 | 7/2004 | Hagiwara | 702/7 |
| 6,819,111 B2 | 11/2004 | Fanini et al. | 324/339 |
| 6,906,521 B2 | 6/2005 | Tabarovsky | 324/334 |
| 6,925,384 B2 | 8/2005 | Frenkel et al. | 702/7 |
| 6,950,749 B2 | 9/2005 | Frenkel et al. | 702/7 |
| 2002/0173913 A1 | 11/2002 | Tabarovsky et al. | 702/7 |
| 2003/0028324 A1 | 2/2003 | Xiao et al. | 702/7 |
| 2003/0055565 A1 | 3/2003 | Omeragic | 702/7 |
| 2003/0057950 A1 | 3/2003 | Gao et al. | 324/339 |
| 2003/0105591 A1 | 6/2003 | Hagiwara | 702/7 |
| 2003/0146752 A1 | 8/2003 | Gianzero et al. | 324/343 |
| 2003/0229449 A1 | 12/2003 | Merchant et al. | 702/7 |
| 2004/0059513 A1 | 3/2004 | Bittar et al. | 702/7 |
| 2004/0108853 A1 | 6/2004 | Rosthal | 324/343 |
| 2004/0183538 A1 | 9/2004 | Hanstein et al. | 324/339 |

* cited by examiner

GEOSTEERING IN EARTH FORMATIONS USING MULTICOMPONENT INDUCTION MEASUREMENTS

CROSS REFERENCES TO RELATED APPLICATIONS

This application is a continuation of U.S. patent application Ser. No. 11/072,570 filed Mar. 4, 2005, now U.S. Pat. No. 7,274,991. Patent application Ser. No. 11/072,570 is a continuation-in-part of U.S. patent application Ser. No. 10/934,596 filed Sep. 3, 2004, now U.S. Pat. No. 7,031,839, and a continuation-in-part of U.S. patent application Ser. No. 10/867,619 filed on Jun. 15, 2004. Patent application Ser. No. 11/072,570 is also related to a concurrently filed U.S. patent application Ser. No. 11/072,027, no U.S. Pat. No. 7,269,515.

BACKGROUND OF THE INVENTION

1. Field of the Invention

The invention is related to the field of electromagnetic induction well logging for determining the resistivity of earth formations penetrated by wellbores. More specifically, the invention addresses the problem of using multicomponent induction measurements in an anisotropic formation for reservoir navigation using determined distances to an interface in the earth formation.

2. Description of the Related Art

To obtain hydrocarbons such as oil and gas, well boreholes are drilled by rotating a drill bit attached at a drill string end. The drill string may be a jointed rotatable pipe or a coiled tube. Boreholes may be drilled vertically, but directional drilling systems are often used for drilling boreholes deviated from vertical and/or horizontal boreholes to increase the hydrocarbon production. Modern directional drilling systems generally employ a drill string having a bottomhole assembly (BHA) and a drill bit at an end thereof that is rotated by a drill motor (mud motor) and/or the drill string. A number of downhole devices placed in close proximity to the drill bit measure certain downhole operating parameters associated with the drill string. Such devices typically include sensors for measuring downhole temperature and pressure, and tool azimuth and inclination. Also used are measuring devices such as a resistivity-measuring device to determine the presence of hydrocarbons and water. Additional downhole instruments, known as measurement-while-drilling (MWD) or logging-while-drilling (LWD) tools, are frequently attached to the drill string to determine formation geology and formation fluid conditions during the drilling operations.

Boreholes are usually drilled along predetermined paths and proceed through various formations. A drilling operator typically controls the surface-controlled drilling parameters during drilling operations. These parameters include weight on bit, drilling fluid flow through the drill pipe, drill string rotational speed (r.p.m. of the surface motor coupled to the drill pipe) and the density and viscosity of the drilling fluid. The downhole operating conditions continually change and the operator must react to such changes and adjust the surface-controlled parameters to properly control the drilling operations. For drilling a borehole in a virgin region, the operator typically relies on seismic survey plots, which provide a macro picture of the subsurface formations and a pre-planned borehole path. For drilling multiple boreholes in the same formation, the operator may also have information about the previously drilled boreholes in the same formation.

In development of reservoirs, it is common to drill boreholes at a specified distance from fluid contacts within the reservoir or from bed boundaries defining the top of a reservoir. In order to maximize the amount of recovered hydrocarbons from such a borehole, the boreholes are commonly drilled in a substantially horizontal orientation in close proximity to the oil water contact, but still within the oil zone. U.S. Pat. RE35386 to Wu et al., having the same assignee as the present application and the contents of which are fully incorporated herein by reference, teaches a method for detecting and sensing boundaries in a formation during directional drilling so that the drilling operation can be adjusted to maintain the drillstring within a selected stratum is presented.

The method comprises the initial drilling of an offset well from which resistivity of the formation with depth is determined. This resistivity information is then modeled to provide a modeled log indicative of the response of a resistivity tool within a selected stratum in a substantially horizontal direction. A directional (e.g., horizontal) well is thereafter drilled wherein resistivity is logged in real time and compared to that of the modeled horizontal resistivity to determine the location of the drill string and thereby the borehole in the substantially horizontal stratum. From this, the direction of drilling can be corrected or adjusted so that the borehole is maintained within the desired stratum. The resistivity sensor typically comprises a transmitter and a plurality of sensors. Measurements may be made with propagation sensors that operate in the 400 kHz and higher frequency range.

A limitation of the method and apparatus used by Wu is that resistivity sensors are responsive to oil/water contacts for relatively small distances, typically no more than 5 m; at larger distances, conventional propagation tools are not responsive to the resistivity contrast between water and oil. One solution that can be used in such a case is to use an induction logging tool that typically operates in frequencies between 10 kHz and 50 kHz. U.S. Pat. No. 6,308,136 to Tabarovsky et al having the same assignee as the present application and the contents of which are fully incorporated herein by reference, teaches a method of interpretation of induction logs in near horizontal boreholes and determining distances to boundaries in proximity to the borehole.

U.S. Pat. No. 5,884,227, issued to Rabinovich et al., having the same assignee as the present invention, is a method of adjusting induction receiver signals for skin effect in an induction logging instrument including a plurality of spaced apart receivers and a transmitter generating alternating magnetic fields at a plurality of frequencies. The method includes the steps of extrapolating measured magnitudes of the receiver signals at the plurality of frequencies, detected in response to alternating magnetic fields induced in media surrounding the instrument, to zero frequency. A model of conductivity distribution of the media surrounding the instrument is generated by inversion processing the extrapolated magnitudes. Rabinovich works equally well under the assumption that the induction tool device has perfect conductivity or zero conductivity. In a measurement-while-drilling device, this assumption does not hold.

The Multi-frequency focusing (MFF) of Rabinovich is an efficient way of increasing depth of investigation for electromagnetic logging tools. It is being successfully used in wireline applications, for example, in processing and interpretation of induction data. MFF is based on specific assumptions regarding behavior of electromagnetic field in frequency domain. For MWD tools mounted on metal mandrels, those assumptions are not valid. Particularly, the composition of a mathematical series describing EM field at low frequencies changes when a very conductive body is placed in the vicinity of sensors. Only if the mandrel material were perfectly conducting, would MFF of Rabinovich be applicable.

U.S. patent application Ser. No. 10/295,969 of Tabarovsky et al. ("the Tabarovsky '969 application"), now U.S. Pat. No. 6,906,521, having the same assignee as the present invention and the contents of which are fully incorporated herein by reference, teaches a modification of the method of Rabinovich that applies MFF to induction measurements made with transmitters and receivers on a mandrel of finite conductivity. U.S. patent application Ser. No. 10/934,596 of Tabarovsky et al. ("the Tabarovsky '596 application), now U.S. Pat. No. 7,031,839 having the same assignee as the present application and the contents of which are fully incorporated herein by reference teaches methods for the optimum design of the MFF acquisition system for deep resistivity measurements in the earth. The frequencies at which the measurements are made are selected based on one or more criteria, such as reducing an error amplification resulting from the MFF, increasing an MFF signal voltage, or increasing an MFF focusing factor. In one embodiment of the invention, the tool has a portion with finite non-zero conductivity. The Tabarovsky '596 application teaches design of the MFF system for both wireline and MWD applications. In the case of MWD applications, the Tabarovsky 596 application also addresses the issue of reservoir navigation.

The teachings discussed above are all directed towards the use of conventional induction tools in which the transmitter and receiver coils are parallel to the tool axis. Such a tool may be referred to as the HDIL tool. U.S. patent application Ser. No. 10/373,365 of Merchant et al, published as US20030229449 having the same assignee as the present application and the contents of which are incorporated herein by reference teaches the use of multicomponent induction logging tools and measurements as an indicator of a distance to a bed boundary and altering the drilling direction based on such measurements. In conventional induction logging tools, the transmitter and receiver antenna coils have axes substantially parallel to the tool axis (and the borehole). The multicomponent tool of Merchant et al. has three transmitters and three receivers, with coils oriented in the x-, y- and z-directions and may be referred to hereafter as the 3DEX™ tool.

The teachings of Merchant are show that the 3DEX™ measurements are very useful in determination of distances to bed boundaries (and in reservoir navigation), Merchant discusses the reservoir navigation problem in terms of measurements made with the borehole in a substantially horizontal configuration (parallel to the bed boundary). This may not always be the case in field applications where the borehole is approaching the bed boundary at an angle. In a situation where the borehole is inclined, then the multicomponent measurements, particularly the cross-component measurements, are responsive to both the distance to the bed boundary and to the anisotropy in the formation. In anisotropic formations, determination of a relative dip angle between the borehole and the anisotropy direction may be used for navigation.

U.S. Pat. No. 6,643,589 to Zhang et al., having the same assignee as the present application and the contents of which are incorporated herein by reference, teaches the inversion of measurements made by a multicomponent logging tool in a borehole to obtain horizontal and vertical resistivities and formation dip and azimuth angles. The inversion is performed using a generalized Marquardt-Levenberg method Knowledge of the relative dip angle could be used for reservoir navigation in anisotropic media. However, the method of Zhang, while extremely useful for wireline applications, may not be computationally fast enough to provide the angles in real time that are necessary for reservoir navigation.

U.S. application Ser. No. 10/186,927 of Xiao et al. (now U.S. Pat. No. 6,885,947), having the same assignee as the present invention and the contents of which are incorporated herein by reference, teaches the determination of a relative dip angle using HDIL and 3DEX™ measurements. Compared to Zhang, the method of Xiao has the added drawback of requiring HDIL measurements. In addition, it is not clear that the dip angles may be determined in real time for reservoir navigation.

There is a need for a method of processing multi-frequency data acquired with real MWD tools having finite non-zero conductivity to get estimates of relative dip angles that may be used in real time for reservoir navigation. The present invention satisfies this need.

SUMMARY OF THE INVENTION

The embodiment of the present invention is a method of evaluating an earth formation. A borehole is drilled in the earth formation using a bottomhole assembly (BHA) having a drillbit. A logging tool on the BHA obtains multicomponent resistivity measurements at least two frequencies. The multicomponent measurements depend on a horizontal resistivity and a vertical resistivity of the anisotropic earth formation. From the multicomponent resistivity measurements, a direction of a conductivity tensor of the earth formation is determined, the determination accounting for a finite, nonzero conductivity of a body of the logging tool. A direction of drilling of the BHA may be controlled based on the determined relative angle. Determination of the direction further may be based on applying a multifrequency focusing to the multicomponent measurements. The results of the multifrequency focusing are separated into fundamental modes from which the horizontal and vertical resistivities may be determined. The method may be used in cross-bedded formations. The method is particularly useful in drilling through thick homogenous anisotropic layers.

Another embodiment of the invention is an apparatus for evaluating an earth formation. The apparatus includes a bottomhole assembly (BHA). A logging tool on the BHA obtains multicomponent resistivity measurements at a plurality of frequencies, the multicomponent measurements depending at least in part on a horizontal resistivity and a vertical resistivity of the anisotropic earth formation. At least one processor determines from the multicomponent measurements a direction of a conductivity tensor of the earth formation, the determination accounting for a finite, nonzero conductivity of a body of the logging tool. The at least one processor may further control a direction of drilling of the BHA based on the determined relative angle. The processor(s) determine the relative angle further based on applying a multifrequency focusing to the multicomponent measurements. The processor(s) separate the results of the multifrequency focusing into fundamental modes from which the horizontal and vertical resistivities may be determined.

Another embodiment of the invention is a computer readable medium for use with an apparatus for evaluating an anisotropic earth formation. The apparatus includes a bottomhole assembly (BHA) having a drillbit which drills a borehole in the earth formation. A logging tool on the BHA obtains multicomponent resistivity measurements at a plurality of frequencies, the multicomponent measurements depending at least in part on a horizontal resistivity and a vertical resistivity of the anisotropic earth formation. The medium includes instructions that when executed by a processor determine a direction of a conductivity tensor of the earth formation based on the multicomponent measurements, the determination accounting for a finite, nonzero conductivity of a body of the logging tool, and control of a direction of drilling of the BHA based on the determined relative angle. The medium may further include instructions for applying multifrequency focusing to the multicomponent measurements, and determining at least two fundamental modes from results of the multifrequency focusing. The medium may be selected from the group consisting of a ROM, an EPROM, an EAROM, a Flash Memory, and/or an Optical disk.

BRIEF DESCRIPTION OF THE DRAWINGS

The present invention is best understood with reference to the accompanying figures in which like numerals refer to like elements and in which.

DETAILED DESCRIPTION OF THE INVENTION

Figure 1:
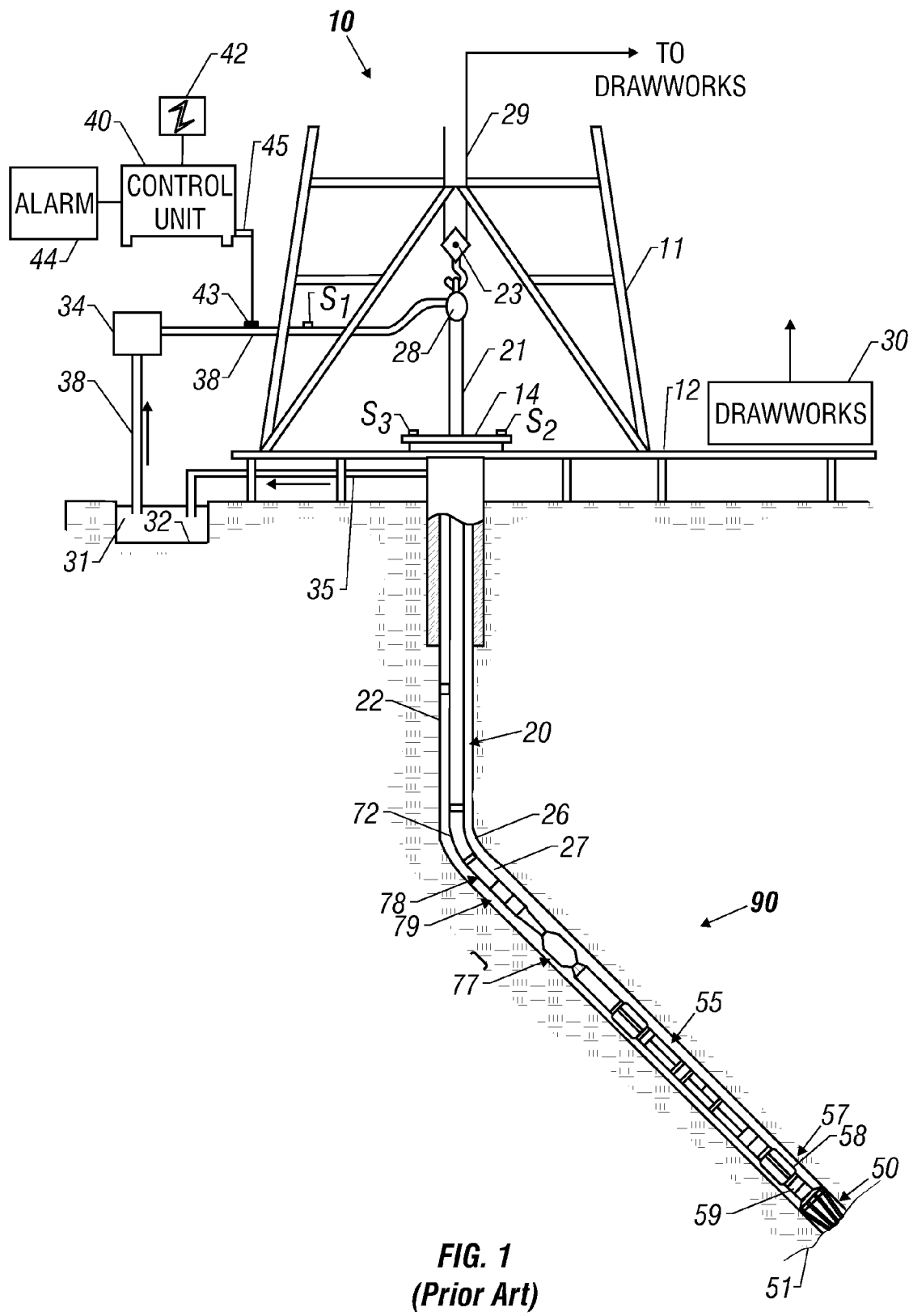
FIG. 1 (Prior Art) shows drilling assembly suitable for use with the method of the present invention.

FIG. 1 shows a schematic diagram of a drilling system 10 with a drillstring 20 carrying a drilling assembly 90 (also referred to as the bottom hole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 or a coiled-tubing extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), to the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel 28, and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 28 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ preferably placed in the line 38 provides information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the invention, the drill bit 50 is rotated by only rotating the drill pipe 22. In another embodiment of the invention, a downhole motor 55 (mud motor) is disposed in the drilling assembly 90 to rotate the drill bit 50 and the drill pipe 22 is rotated usually to supplement the rotational power, if required, and to effect changes in the drilling direction.

In the embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the invention, a drilling sensor module 59 is placed near the drill bit 50. The drilling sensor module contains sensors, circuitry and processing software and algorithms relating to the dynamic drilling parameters. Such parameters preferably include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors $S_1$-$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 preferably includes a computer or a microprocessor-based processing system, memory for storing programs or models and data, a recorder for recording data, and other peripherals.

The control unit 40 is preferably adapted to activate alarms 44 when certain unsafe or undesirable operating conditions occur.

Figure 1A:
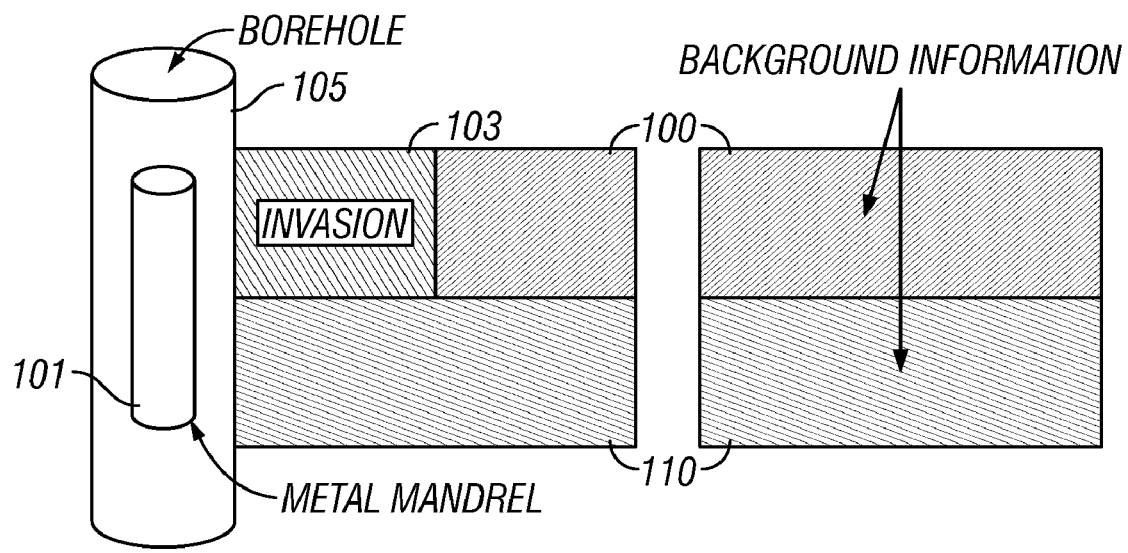
FIG. 1A (Prior Art) shows an induction tool conveyed within a formation layer.

FIG. 1A shows a typical configuration of a metal mandrel 101 within a borehole 105. Two formation layers, an upper formation layer 100 and a lower formation layer 110, are shown adjacent to the borehole 105. A prominent invasion zone 103 is shown in the upper formation layer.

Figure 2:
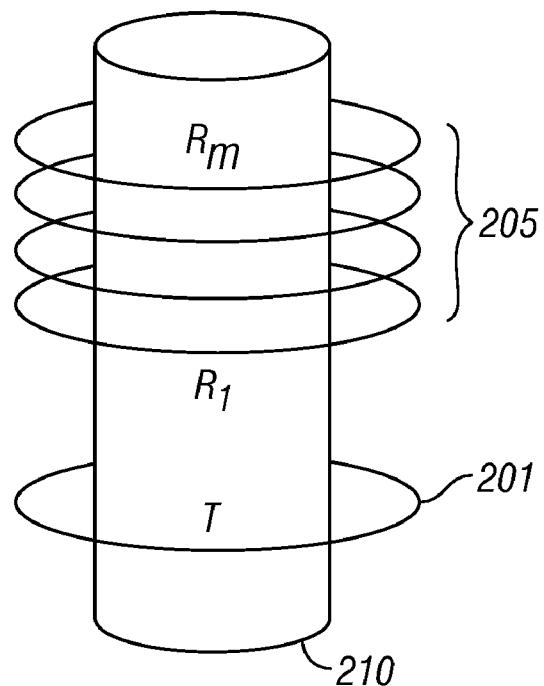
FIG. 2 (Prior Art) illustrates an exemplary multi-array induction tool.

FIG. 2 shows a generic tool for evaluation of MFF in MWD applications (MFFM). A transmitter, T, 201 is excited at a plurality of RF frequencies $f_1, \ldots, f_n$. For illustrative purposes, eight frequencies are considered: 100, 140, 200, 280, 400, 560, 800, and 1600 kHz. A plurality of axially-separated receivers, $R_1, \ldots, R_m$, 205 are positioned at distances, $L_1, \ldots, L_m$, from transmitter. For illustrative purposes, distances of the seven receivers are chosen as L=0.3, 0.5, 0.7, 0.9, 1.1, 1.3, and 1.5 m. Transmitter 201 and receivers 205 enclose a metal mandrel 210. In all examples, the mandrel radius is 8 cm, the transmitter radius is 9 cm, and the radius of the plurality of receivers is 9 cm. Data is obtained by measuring the responses of the plurality of receivers 205 to an induced current in the transmitter 201. Such measured responses can be, for example, a magnetic field response. The mandrel conductivity may be assumed perfect (perfectly conducting mandrel, PCM) or finite (finite conductivity mandrel, FCM). In the method of the present invention, obtained data is corrected for the effects of the finite conductivity mandrel, such as skin effect, for example, in order to obtain data representative of an induction tool operated in the same manner, having an infinite conductivity. Corrected data can then be processed using multi-frequency focusing. Typical results of multi-frequency focusing can be, for instance, apparent conductivity. A calculated relationship can obtain value of conductivity, for example, when frequency is equal to zero. Any physical quantity oscillating in phase with the transmitter current is called real and any measurement shifted 90 degrees with respect to the transmitter current is called imaginary, or quadrature.

Obtaining data using a nonconducting mandrel is discussed in Rabinovich et al., U.S. Pat. No. 5,884,227, having the same assignee as the present invention, the contents of which are fully incorporated herein by reference. When using a nonconducting induction measurement device, multi-frequency focusing (MFF) can be described using a Taylor series expansion of EM field frequency. A detailed consideration for MFFW (wireline MFF applications) can be used. Transmitter 201, having a distributed current $J(x,y,z)$ excites an EM field with an electric component $E(x,y,z)$ and a magnetic component $H(x,y,z)$. Induced current is measured by a collection of coils, such as coils 205.

An infinite conductive space has conductivity distribution $\sigma(x,y,z)$, and an auxiliary conductive space ('background conductivity') has conductivity $\sigma_0(x,y,z)$. Auxiliary electric dipoles located in the auxiliary space can be introduced. For the field components of these dipoles, the notation $e^n(P_0,P)$, $h^n(P_0,P)$, where n stands for the dipole orientation, P and $P_0$, indicate the dipole location and the field measuring point, respectively. The electric field $E(x,y,z)$ satisfies the following integral equation (see L. Tabarovsky, M. Rabinovich, 1998, Real time 2-D inversion of induction logging data. Journal of Applied Geophysics, 38, 251-275):

$$E(P_0) = E^0(P_0) + \int_{-\infty}^{+\infty}\int_{-\infty}^{+\infty}\int_{-\infty}^{+\infty} (\sigma - \sigma_0)\hat{e}(P_0 \mid P)E(P)dxdydz. \quad (1)$$

where $E^0(P_0)$ is the field of the primary source J in the background medium $\sigma_0$. The 3×3 matrix $e(P_0|P)$ represents the electric field components of three auxiliary dipoles located in the integration point P.

The electric field, E, may be expanded in the following Taylor series with respect to the frequency:

$$E = \sum_{k=2}^{k=\infty} u_{k/2}(-i\omega)^{k/2} \quad (2)$$

$$u_{3/2} = 0$$

The coefficient $u_{5/2}$ corresponding to the term $\omega^{5/2}$ is independent of the properties of a near borehole zone, thus $u_{5/2}=u_{5/2}{}^0$. This term is sensitive only to the conductivity distribution in the undisturbed formation (100) shown in FIG. 1A.

The magnetic field can be expanded in a Taylor series similar to Equation (2):

$$H = \sum_{k=0}^{k=\infty} s_{k/2}(-i\omega)^{k/2} \quad (3)$$

$$s_{1/2} = 0$$

In the term containing $\omega^{3/2}$, the coefficient $s_{3/2}$ depends only on the properties of the background formation, in other words $s_{3/2}=s_{3/2}{}^0$. This fact is used in multi-frequency processing. The purpose of the multi-frequency processing is to derive the coefficient $u_{5/2}$ if the electric field is measured, and coefficient $s_{3/2}$ if the magnetic field is measured. Both coefficients reflect properties of the deep formation areas.

If an induction tool consisting of dipole transmitters and dipole receivers generates the magnetic field at m angular frequencies, $\omega_1, \omega_2, \ldots, \omega_m$, the frequency Taylor series for the imaginary part of magnetic field has the following form:

$$\text{Im}(H) = \sum_{k=1}^{k=\infty} s_{k/2}\omega^{k/2} \quad (4)$$

$$s_{2j} = 0; \quad j = 1, 2, \ldots,.$$

where $s_{k/2}$ are coefficients depending on the conductivity distribution and the tool's geometric configuration, not on the frequency. Rewriting the Taylor series for each measured frequency obtains:

$$\begin{pmatrix} H(\omega_1) \\ H(\omega_2) \\ \vdots \\ H(\omega_{m-1}) \\ H(\omega_m) \end{pmatrix} = \begin{pmatrix} \omega & \omega_1^{3/2} & \omega_1^{5/2} & \ldots & \omega_1^{n/2} \\ \omega & \omega_2^{3/2} & \omega_2^{5/2} & \ldots & \omega_2^{n/2} \\ \vdots & \vdots & \vdots & \ldots & \vdots \\ \omega & \omega_{m-1}^{3/2} & \omega_{m-1}^{5/2} & \ldots & \omega_{m-1}^{n/2} \\ \omega & \omega_m^{3/2} & \omega_m^{5/2} & \ldots & \omega_m^{n/2} \end{pmatrix} \begin{pmatrix} s_1 \\ s_{3/2} \\ s_{5/2} \\ \vdots \\ s_{n/2} \end{pmatrix}. \quad (5)$$

Figure 3:
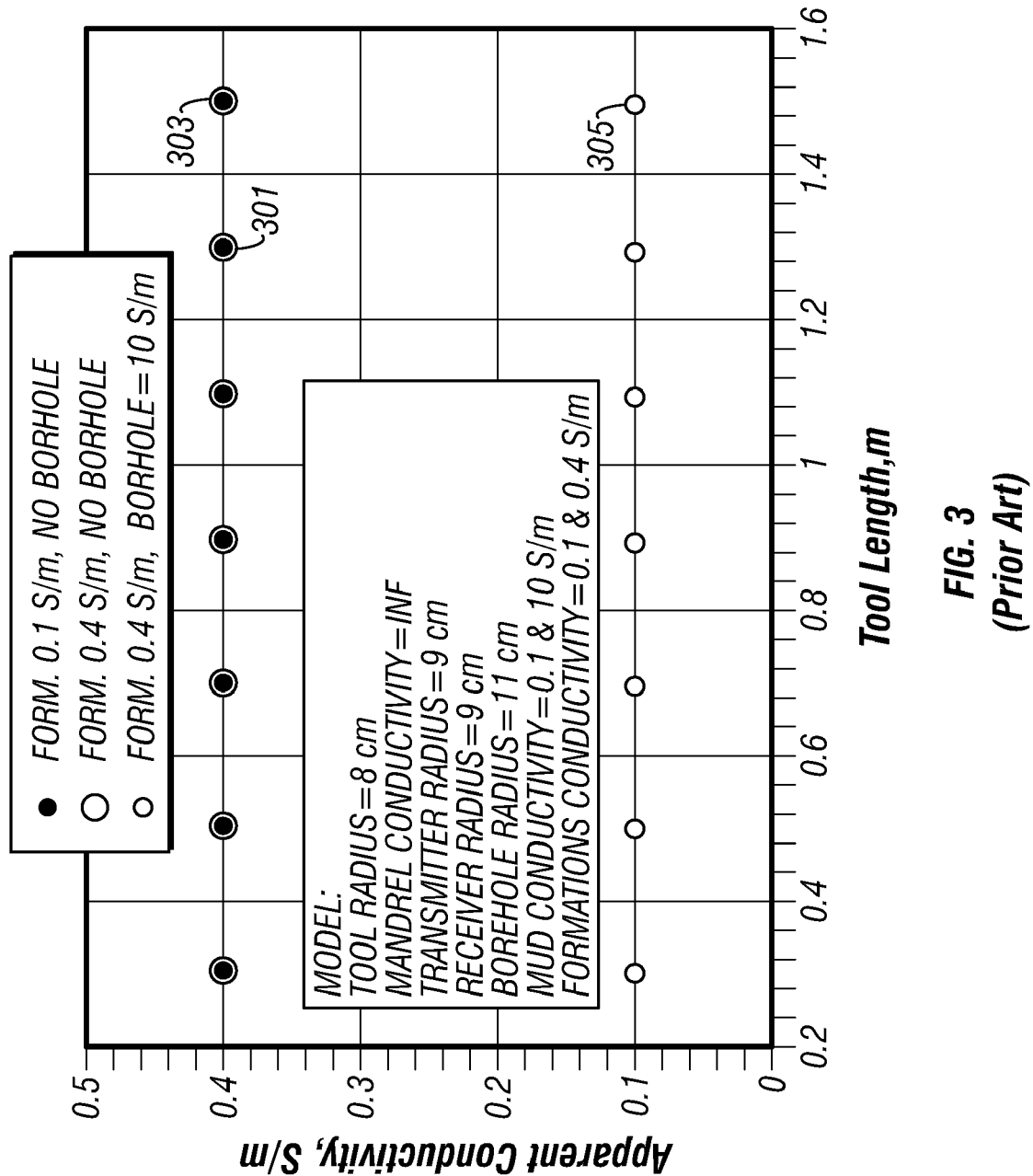
FIG. 3 (Prior Art) shows responses of a induction tool with a perfectly conducting mandrel.

Solving the system of Equations (5), it is possible to obtain the coefficient $s_{3/2}$. It turns out that the expansion is the same for a perfectly conducting mandrel and a non-conducting mandrel FIG. 3 shows the results of MFF for a perfectly conducting mandrel. In FIG. 3, borehole radius is 11 cm. MFF, as performed based on Eq. (5) and Eq. (3) (MFFW) produces the expected results. Data sets 301 and 305 are shown for a formation having 0.4 S/m and 0.1 S/m respectively, with no borehole effects. Data set 303 is shown for a formation having 0.4 S/m and a borehole having mud conductivity 10 S/m and 0.1 S/m. Apparent conductivity data, processed using MFFW, do not depend on borehole parameters or tool length. Specifically, apparent conductivity equals to the true formation conductivity. The present invention can be used to correct from an FCM tool to a PCM with the same sensor arrangements.

Fundamental assumptions enabling implementing MFFW are based on the structure of the Taylor series, Eq. (2) and Eq. (3). These assumptions are not valid if a highly conductive body is present in the vicinity of sensors (e.g., mandrel of MWD tools). The present invention uses an asymptotic theory that enables building MFF for MWD applications (MFFM).

The measurements from a finite conductivity mandrel can be corrected to a mandrel having perfect conductivity. Deriving a special type of integral equations for MWD tools enables this correction. The magnetic field measured in a typical MWD electromagnetic tool may be described by $$H_\alpha(P) = H_\alpha^0(P) + \beta \int_S \{\vec{H}^{M\alpha}\vec{h}\} dS \quad (6)$$

where $H_\alpha(P)$ is the magnetic field measure along the direction $\alpha$ ($\alpha$-component), P is the point of measurement, $H_\alpha^0(P)$ is the $\alpha$-component of the measured magnetic field given a perfectly conducting mandrel, S is the surface of the tool mandrel, $\beta = 1/\sqrt{-i\omega\mu\sigma_c}$, where $\omega$ and $\mu$ are frequency and magnetic permeability, and $^{m\alpha}h$ is the magnetic field of an auxiliary magnetic dipole in a formation where the mandrel of a finite conductivity is replaced by an identical body with a perfect conductivity. The dipole is oriented along $\alpha$-direction. At high conductivity, $\beta$ is small.

Equation (6) is evaluated using a perturbation method, leading to the following results:

$$H_\alpha = \sum_{i=0}^{i=\infty} {}^{(i)}H_\alpha \quad (7)$$

$$^{(0)}H_\alpha = H_\alpha^0 \quad (8)$$

$$^{(i)}H_\alpha = \beta \int_S \{^{(i-1)}\vec{H}^{M\alpha}\vec{h}\} dS \quad (9)$$

$i = 1, \ldots, \infty$

In a first order approximation that is proportional to the parameter $\beta$:

$$^{(1)}H_\alpha = \beta \int_S \{^{(0)}\vec{H}^{M\alpha}\vec{h}\} dS = \beta \int_S \{\vec{H}_0^{M\alpha}\vec{h}\} dS \quad (10)$$

The integrand in Eq. (10) is independent of mandrel conductivity. Therefore, the integral on the right-hand side of Eq. (10) can be expanded in wireline-like Taylor series with respect to the frequency, as:

$$\int_S \{\vec{H}_0^{M\alpha}\vec{h}\} dS \approx b_0 + (-i\omega\mu)b_1 + (-i\omega\mu)^{3/2}b_{3/2} + (-i\omega\mu)^2 b_2 + \ldots \quad (11)$$

Substituting Eq. (11) into Eq. (10) yields:

$$^{(1)}H_\alpha = \quad (12)$$
$$\frac{1}{\sqrt{\sigma_c}}\left(\frac{b_0}{(-i\omega\mu)^{1/2}} + (-i\omega\mu)^{1/2}b_1 + (-i\omega\mu)b_{3/2} + (-i\omega\mu)^{3/2}b_2 + \ldots\right)$$

Further substitution in Eqs. (7), (8), and (9) yield:

$$H_\alpha \approx H_\alpha^0 + \frac{1}{\sqrt{\sigma_c}} \quad (13)$$
$$\left(\frac{b_0}{(-i\omega\mu)^{1/2}} + (-i\omega\mu)^{1/2}b_1 + (-i\omega\mu)b_{3/2} + (-i\omega\mu)^{3/2}b_2 + \ldots\right)$$

Considering measurement of imaginary component of the magnetic field, Equation (5), modified for MWD applications has the following form:

$$\begin{pmatrix} H(\omega_1) \\ H(\omega_2) \\ \vdots \\ H(\omega_{m-1}) \\ H(\omega_m) \end{pmatrix} = \begin{pmatrix} \omega_1^{1/2} & \omega_1^1 & \omega_1^{3/2} & \omega_1^{5/2} & \ldots & \omega_1^{n/2} \\ \omega_2^{1/2} & \omega_2^1 & \omega_2^{3/2} & \omega_2^{5/2} & \ldots & \omega_2^{n/2} \\ \vdots & \vdots & \vdots & \vdots & \ldots & \vdots \\ \omega_{m-1}^{1/2} & \omega_{m-1}^1 & \omega_{m-1}^{3/2} & \omega_{m-1}^{5/2} & \ldots & \omega_{m-1}^{n/2} \\ \omega_m^{1/2} & \omega_m^1 & \omega_m^{3/2} & \omega_m^{5/2} & \ldots & \omega_m^{n/2} \end{pmatrix} \begin{pmatrix} s_{1/2} \\ s_1 \\ s_{3/2} \\ s_{5/2} \\ \vdots \\ s_{n/2} \end{pmatrix} \quad (14)$$

Details are given in the Appendix. The residual signal (third term) depends on the mandrel conductivity, but this dependence is negligible due to very large conductivity of the mandrel. Similar approaches may be considered for the voltage measurements.

In Eq. (13), the term $H_\alpha^0$ describes effect of PCM, and the second term containing parentheses describes the effect of finite conductivity. At relatively low frequencies, the main effect of finite conductivity is inversely proportional to $\omega^{1/2}$ and $\sigma^{1/2}$:

$$H_\alpha \approx H_\alpha^0 + \frac{1}{\sqrt{\sigma_c}}\left(\frac{b_0}{(-i\omega\mu)^{1/2}}\right) \quad (15)$$

Figure 4:
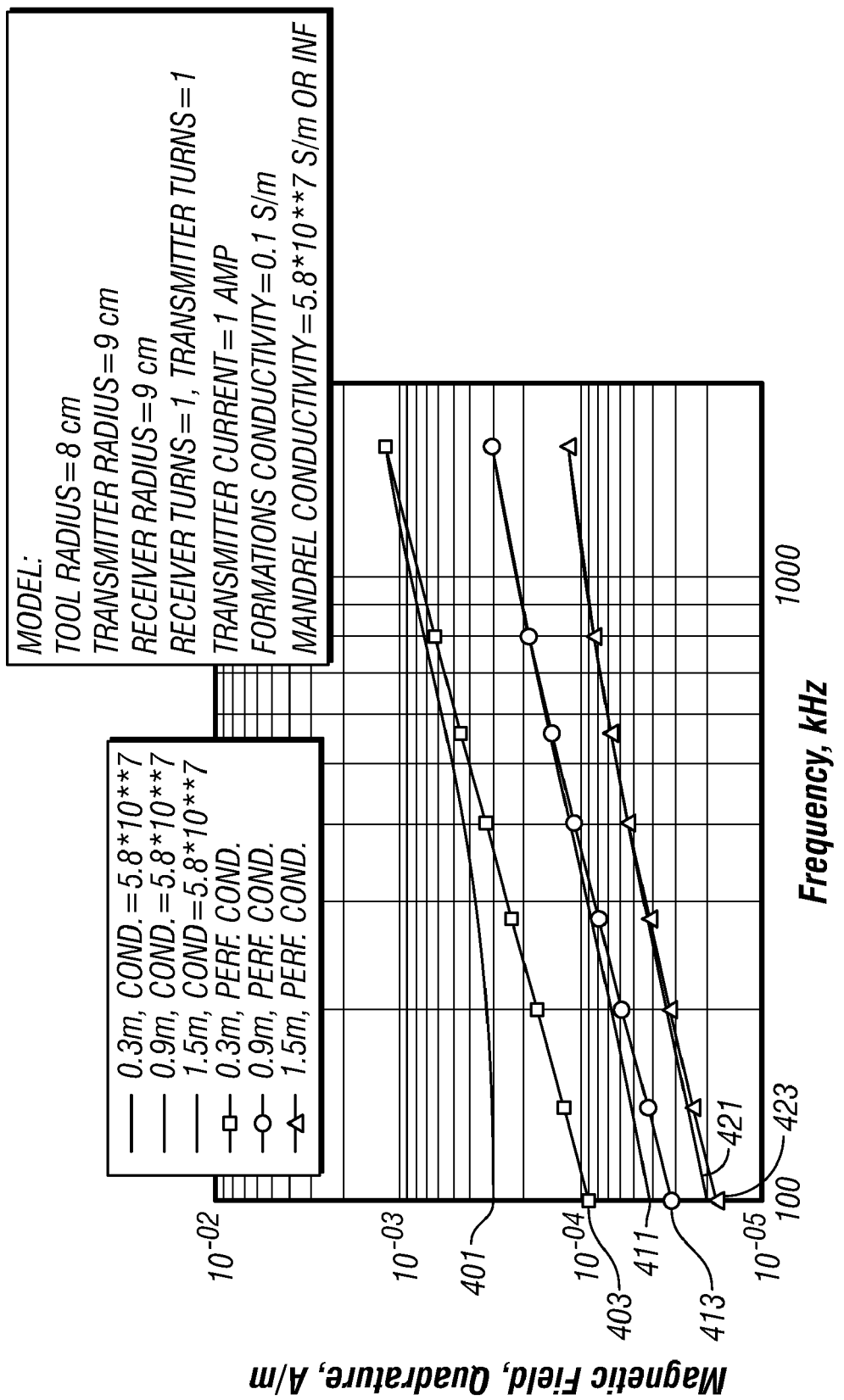
FIG. 4 (Prior Art) shows the effect of finite mandrel conductivity.
Figure 5:
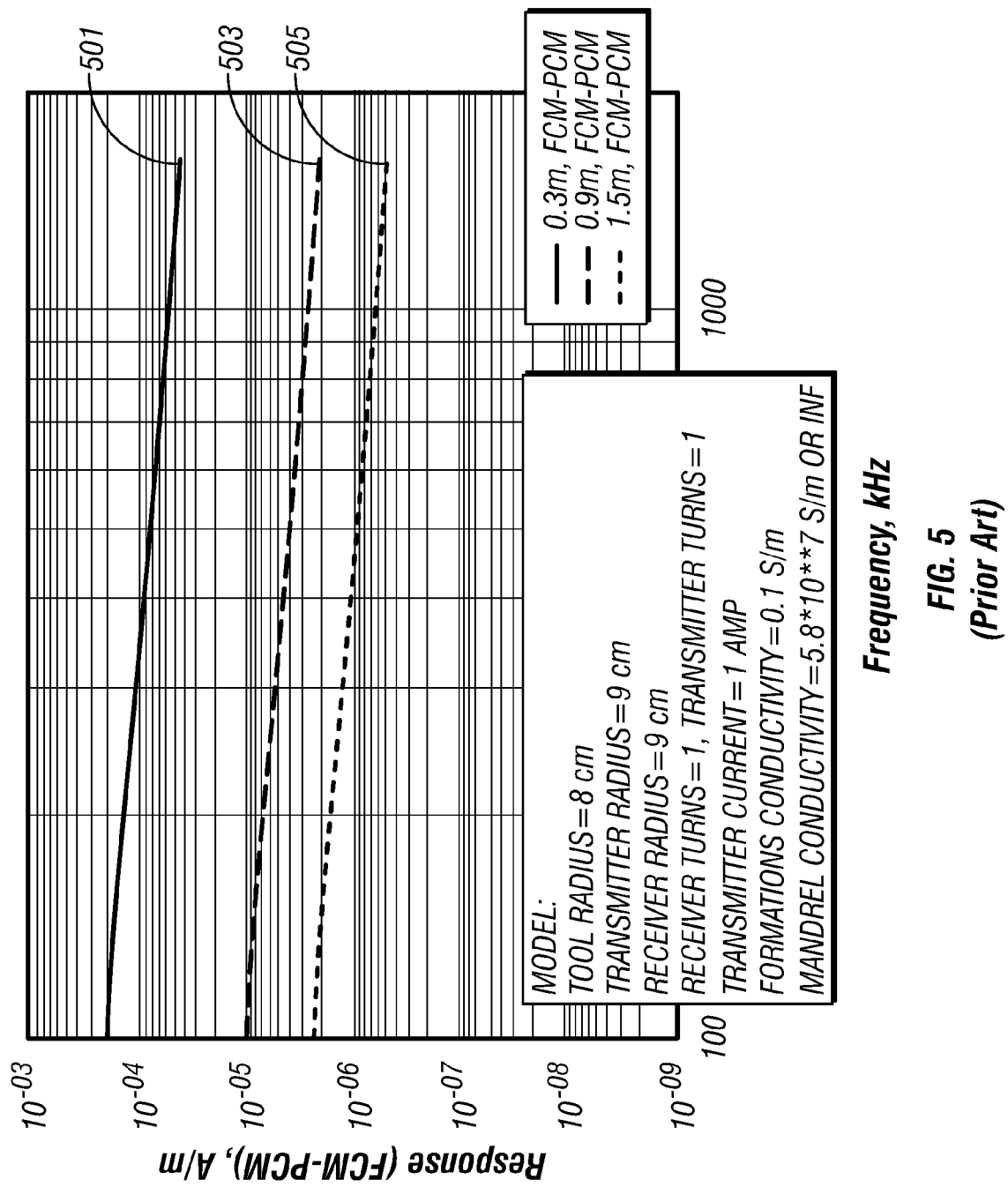
FIG. 5 (Prior Art) shows the difference between finite conducting mandrel and perfect conducting mandrel at several frequencies.

FIGS. 4 and 5 confirm the validity of Equation (15). Values shown in FIG. 4 are calculated responses of PCM and FCM tools in a uniform formation with conductivity of 0.1 S/m with a transmitter current of 1 Amp. FIG. 4 shows three pairs of data curves: 401 and 403; 411 and 413; and 421 and 423. Within each pairing, the differences of the individual curves are due only to the conductivity of the mandrel. Curves 401 and 403 are measured using a receiver separated from the transmitter by 0.3 m. Curve 401 is measured with a mandrel having 5.8*10⁷ S/m and Curve 403 assumes perfect conductivity. Similarly, curves 411 and 413 are measured using receiver separated from the transmitter by 0.9 m. Curve 411 is measured with a mandrel having 5.8*10⁷ S/m and Curve 413 assumes perfect conductivity. Lastly, curves 421 and 423 are measured using receiver separated from the transmitter by 1.5 m. Curve 421 is measured with a mandrel having 5.8*10⁷ S/m and Curve 423 assumes perfect conductivity. Curves 401, 411, 421, indicative of the curves for FCM diverge from curves 403, 413, and 423, respectively, in the manner shown in Eq. (15), (i.e., $1/\omega^{1/2}$ divergence).

FIG. 5 shows that, as a function of frequency, the difference of FCM and PCM responses follows the rule of $1/\omega^{1/2}$ with a very high accuracy. The scale value represents the difference in values between responses obtained for PCM and FCM (PCM-FCM in A/m) at several frequencies. Actual formation conductivity is 0.1 S/m. Curve 501 demonstrates this difference for a receiver-transmitter spacing of 0.3 m. Curves 503 and 505 demonstrate this difference for receiver transmitter spacing of 0.9 m and 1.5 m, respectively.

Figure 6:
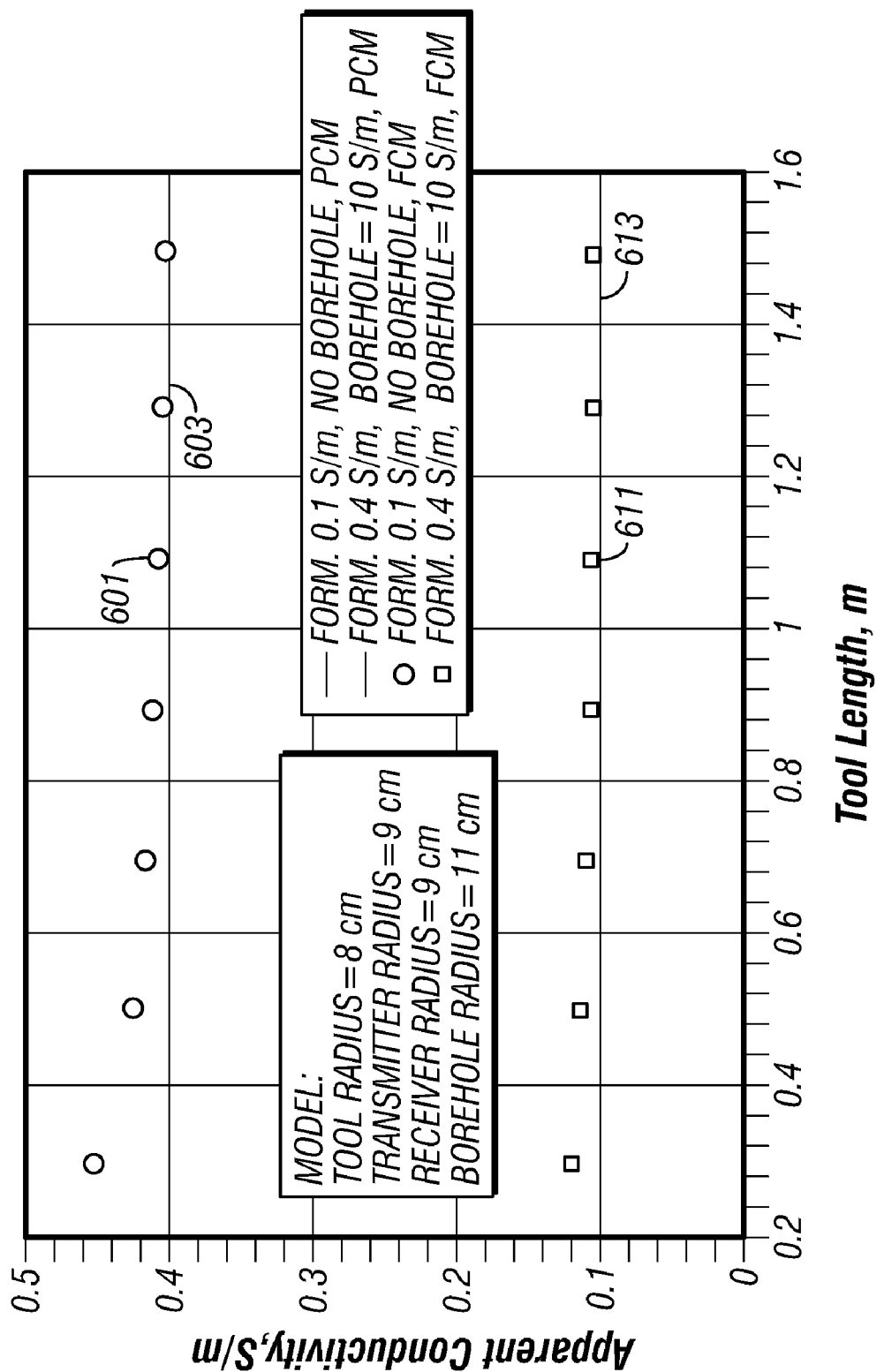
FIG. 6 (Prior Art) shows the effect of wireline multi-frequency focusing processing of data acquired with perfectly conducting mandrel and finite conducting mandrel.

FIG. 6 shows the inability of prior methods of MFFW to correct data acquired from FCM to that of PCM. The results are from conductivity measurements in a uniform space with conductivity of 0.1 S/m and in a space with conductivity 0.4 S/m containing a borehole. The borehole has a radius of 11 cm and a conductivity of 10 S/m. In both models, PCM and FCM responses are calculated and shown. In the FCM case, the mandrel conductivity is 2.8*10⁷ S/m. As mentioned previously, MFFW is applicable to PCM tools. FIG. 6 shows the results of PCM (603 and 613) do not depend on tool spacing and borehole parameters. Obtained values for apparent conductivity are very close to the real formation conductivity. However, for an FCM tool, such as 601 and 611, there is a dependence of MFFW on borehole parameters and tool length. The present invention addresses two of the major effects: the residual influence of the imperfect mandrel conductivity, and borehole effects.

Figure 7:
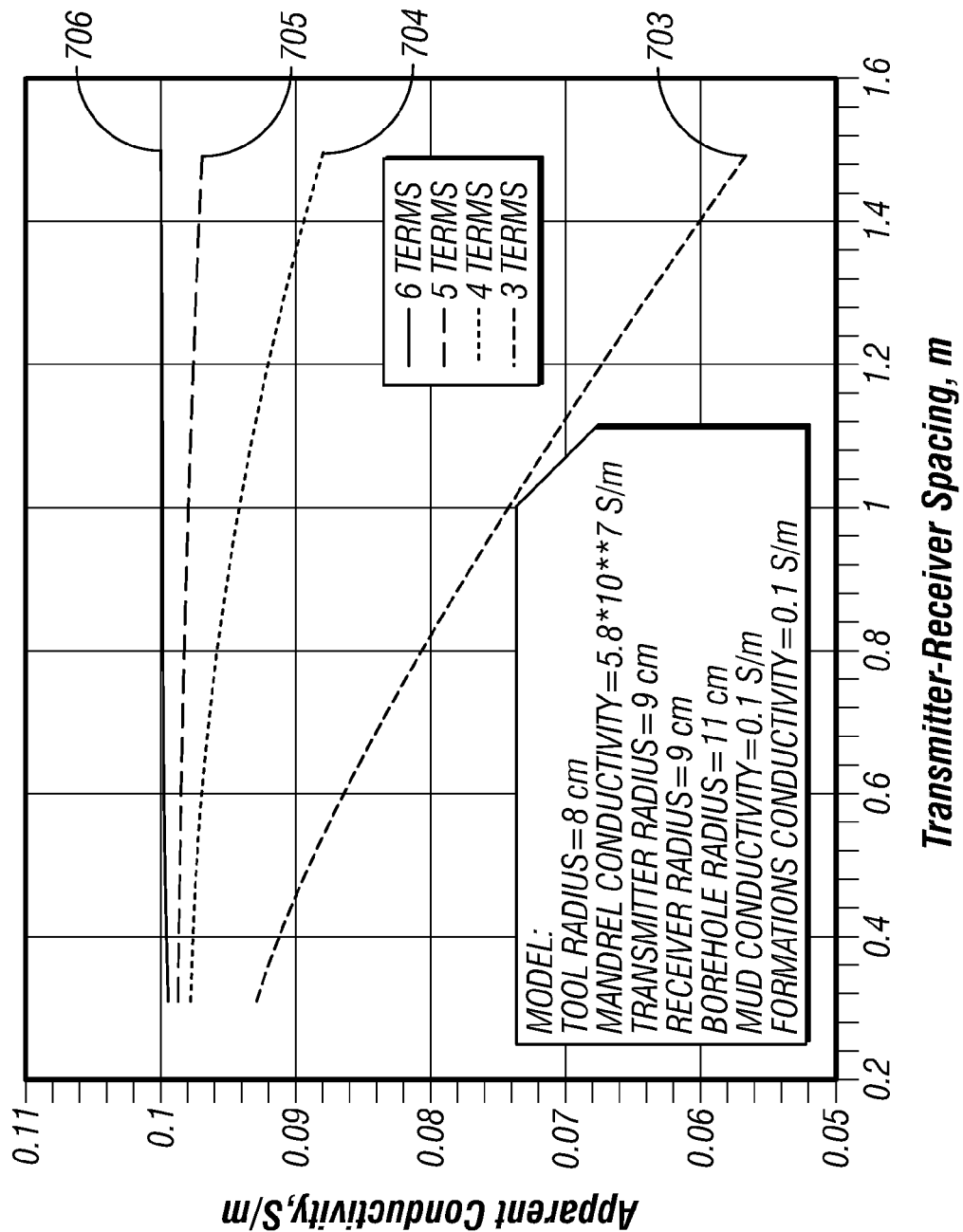
FIG. 7 (Prior Art) shows the convergence of the method of the present invention with the increased number of expansion terms.

FIG. 7 illustrates convergence of the MFFM method as the number of terms in the expansion of Eq. (13) increases. Eight frequencies are used for the MFFM processing: 100, 140, 200, 280, 400, 460, 800, and 1600 kHz. Curve 703 shows results with an expansion having 3 terms. Curve 703 shows a large deviation from true conductivity at long tool length. Curves 704, 705, and 706 show results with an expansion having 4, 5, and 6 terms respectively. About 5 or 6 terms of the Taylor series are required for an accurate correction to true conductivity of 01 S/m. FIG. 7 also illustrates the ability of convergence regardless of tool length. Significantly, the factor k (equal to 15594 S/(Amp/m²)) for transforming magnetic field to conductivity is independent of spacing.

Figure 8:
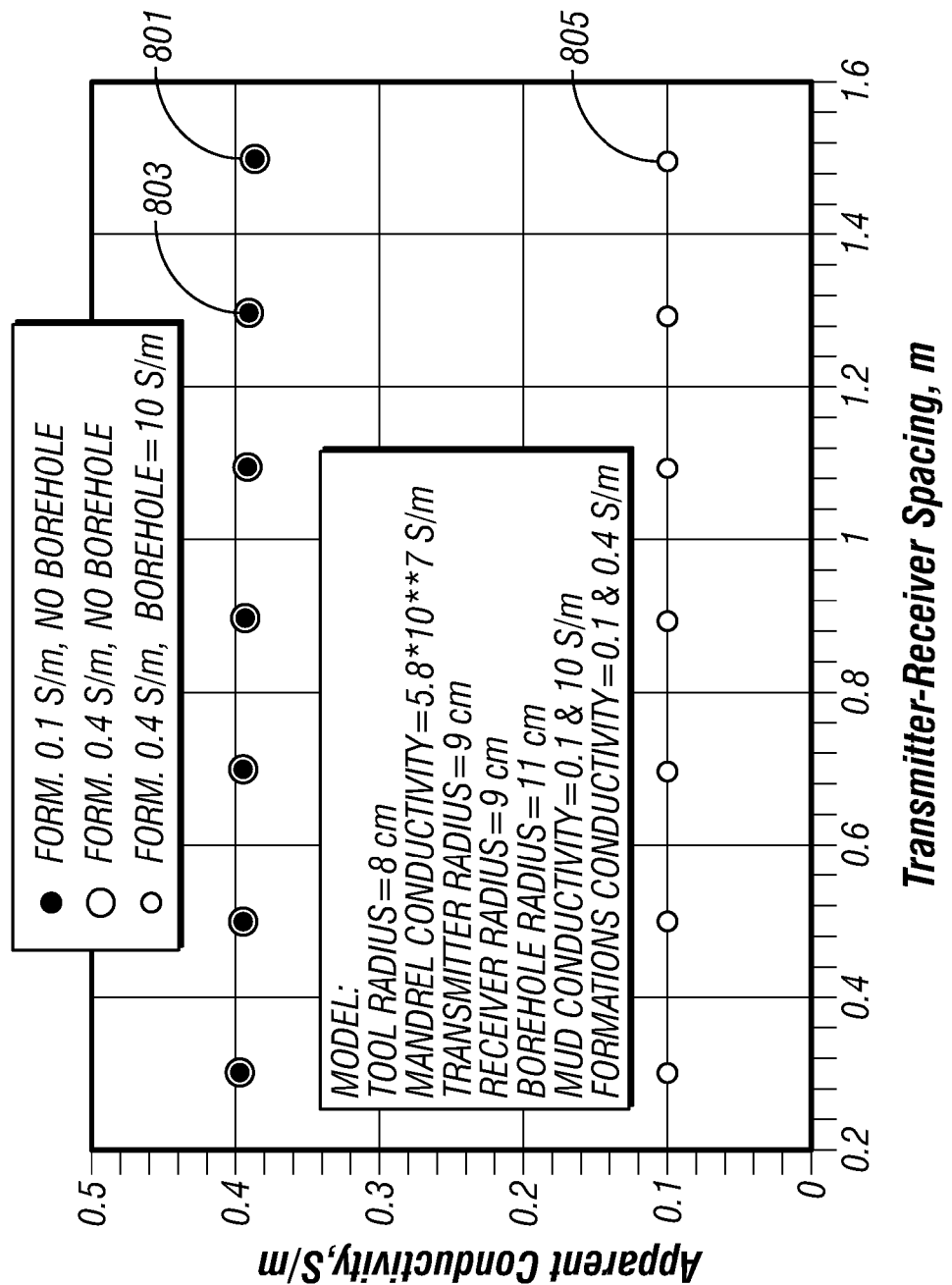
FIG. 8 (Prior Art) shows multi-frequency focusing of the finite conducting mandrel response.

FIG. 8 presents the results of the MFFM method in formations with and without borehole. Data points 801 and 805 show data received from formation having 0.4 S/m and 0.1 S/m respectively, with no borehole effects. Data points 803 shows data received from formation having conductivity 0.4 S/m with a borehole having 10 S/m. FIG. 8 shows that the effect of the borehole is completely eliminated by the method of the present invention. FIG. 8 also shows that after applying the method of the present invention, the value of the response data is independent of the spacing of the receivers. This second conclusion enables a tool design for deep-looking MWD tools using short spacing, further enabling obtaining data from the background formation (100 and 110 in FIG. 1A) and reducing difficulties inherent in data obtained from an invasion zone (103 in FIG. 1A). In addition, focused data are not affected by the near borehole environment. Results of FIG. 8 can be compared to FIG. 3.

The problem of selection of the frequencies is discussed in the Tabarovsky '596 application. To summarize the results therein, the frequency set $\omega_1, \omega_2, \ldots, \omega_m$ is optimal when the basis $\vec{\omega}^{1/2}, \vec{\omega}^1, \vec{\omega}^{3/2}, \ldots, \vec{\omega}^{n/2}$ in eqn. (14) is as much linearly independent as possible. The measure of the linear independence of any basis is the minimal eigenvalue of the Gram matrix C of its vectors normalized to unity:

$$C_{i,j} = \left( \frac{\vec{\omega}^{p_i}}{\|\vec{\omega}^{p_i}\|}, \frac{\vec{\omega}^{p_j}}{\|\vec{\omega}^{p_j}\|} \right). \tag{17}$$

The matrix C can be equivalently defined as follows: we introduce matrix B as $$\hat{B} = \hat{A}^T \hat{A} \tag{18},$$

where A is the matrix on the right hand side of eqn. (14).

Normalizing the matrix C:

$$C_{i,j} = \frac{B_{i,j}}{\sqrt{B_{i,i} B_{j,j}}}. \tag{19}$$

Then maximizing the minimum singular value of matrix C will provide the most stable solution for which we are looking. In Tabarovsky '596, use is made of a standard SVD routine based on Golub's method to extract singular values of matrix C and the Nelder-Mead simplex optimization algorithm to search for the optimum frequency set.

Figure 9:
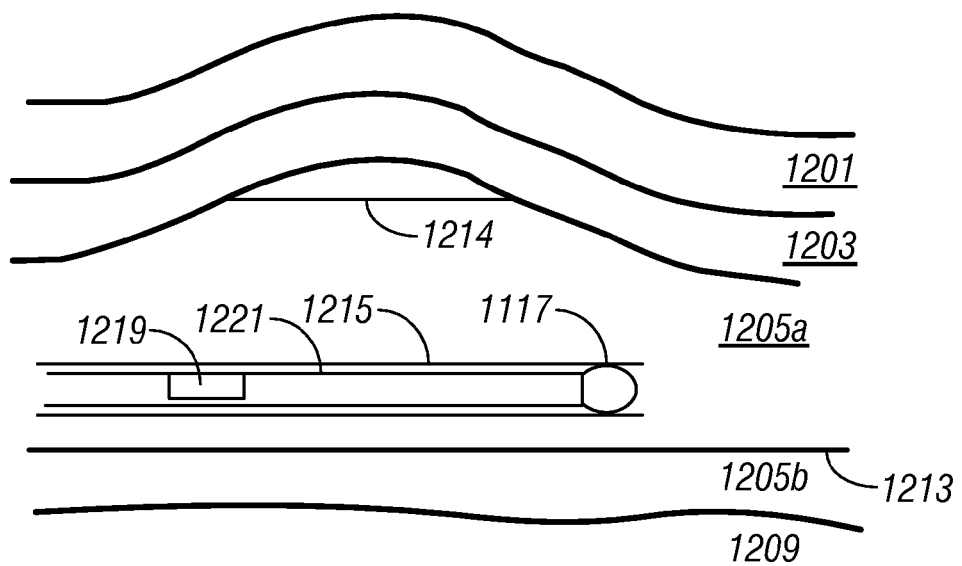
FIG. 9 shows an MWD tool in the context of reservoir navigation.

One application of the method of the present invention (with its ability to make resistivity measurements up to 20 m away from the borehole) is in reservoir navigation. In development of reservoirs, it is common to drill boreholes at a specified distance from fluid contacts within the reservoir. An example of this is shown in FIG. 9 where a porous formation denoted by 1205a, 1205b has an oil water contact denoted by 1213. The porous formation is typically capped by a caprock such as 1203 that is impermeable and may further have a non-porous interval denoted by 1209 underneath. The oil-water contact is denoted by 1213 with oil above the contact and water below the contact: this relative positioning occurs due to the fact the oil has a lower density than water. In reality, there may not be a sharp demarcation defining the oil-water contact; instead, there may be a transition zone with a change from high oil saturation at the top to a high water saturation at the bottom. In other situations, it may be desirable to maintain a desired spacing from a gas-oil. This is depicted by 1214 in FIG. 9. It should also be noted that a boundary such as 1214 could, in other situations, be a gas-water contact.

In order to maximize the amount of recovered oil from such a borehole, the boreholes are commonly drilled in a substantially horizontal orientation in close proximity to the oil water contact, but still within the oil zone. U.S. Pat. RE35386 to Wu et al, having the same assignee as the present application and the contents of which are fully incorporated herein by reference, teaches a method for detecting and sensing boundaries in a formation during directional drilling so that the drilling operation can be adjusted to maintain the drillstring within a selected stratum is presented. The method comprises the initial drilling of an offset well from which resistivity of the formation with depth is determined. This resistivity information is then modeled to provide a modeled log indicative of the response of a resistivity tool within a selected stratum in a substantially horizontal direction. A directional (e.g., horizontal) well is thereafter drilled wherein resistivity is logged in real time and compared to that of the modeled horizontal resistivity to determine the location of the drill string and thereby the borehole in the substantially horizontal stratum. From this, the direction of drilling can be corrected or adjusted so that the borehole is maintained within the desired stratum. The configuration used in the Wu patent is schematically denoted in FIG. 9 by a borehole 1215 having a drilling assembly 1221 with a drill bit 1217 for drilling the borehole. The resistivity sensor is denoted by 1219 and typically comprises a transmitter and a plurality of sensors.

The discussion above was based on MFFM for an induction tool in which the transmitter and receiver axes are coaxial with the tool axis (FIG. 2). However, the MFFM method is equally applicable to other configurations of the transmitters and receivers. In particular, MFFM may also be used with the 3DEX™ tool of Baker Hughes Incorporated schematically illustrated in FIG. 10.

Figure 10:
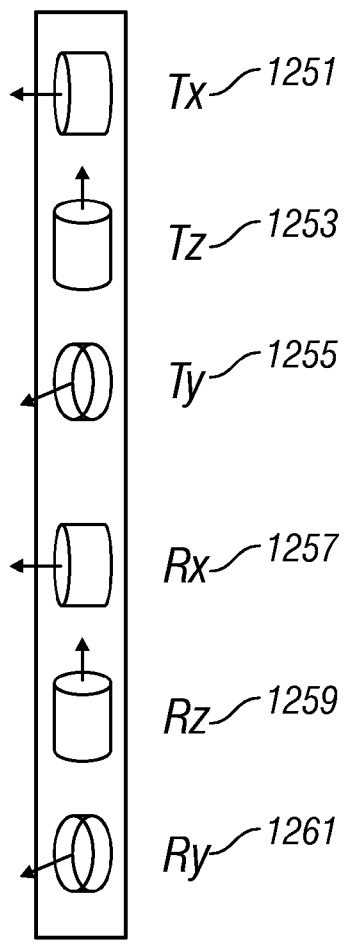
FIG. 10 (Prior Art) shows the configuration of coils of a multicomponent induction logging tool.

Shown in FIG. 10 is the configuration of transmitter and receiver coils in a the 3DEX™ induction logging instrument of Baker Hughes Incorporated. Such a logging instrument is an example of a transverse induction logging tool. Three orthogonal transmitters 1251, 1253 and 1255 that are referred to as the $T_x$, $T_z$, and $T_y$ transmitters are shown (the z-axis is the longitudinal axis of the tool). Corresponding to the transmitters 1251, 1253 and 1255 are receivers 1257, 1259 and 1261, referred to as the $R_x$, $R_z$, and $R_y$ receivers, for measuring the corresponding components ($h_{xx}$, $h_{yy}$, $h_{zz}$) of induced signals. In addition, cross-components are also measured. These are denoted by $h_{xy}$, $h_{xz}$ etc. For each component, the first index indicates the orientation of a transmitter and the second index specifies the orientation of a receiver.

The use of a multicomponent induction tool is particularly important for reservoir navigation in anisotropic formations. In an anisotropic formation, the measurements made by a multiarray tool are responsive to both the horizontal and vertical resistivities of the formation. Multicomponent measurements are capable of distinguishing the effects of a bed boundary from anisotropy effects.

Figure 11:
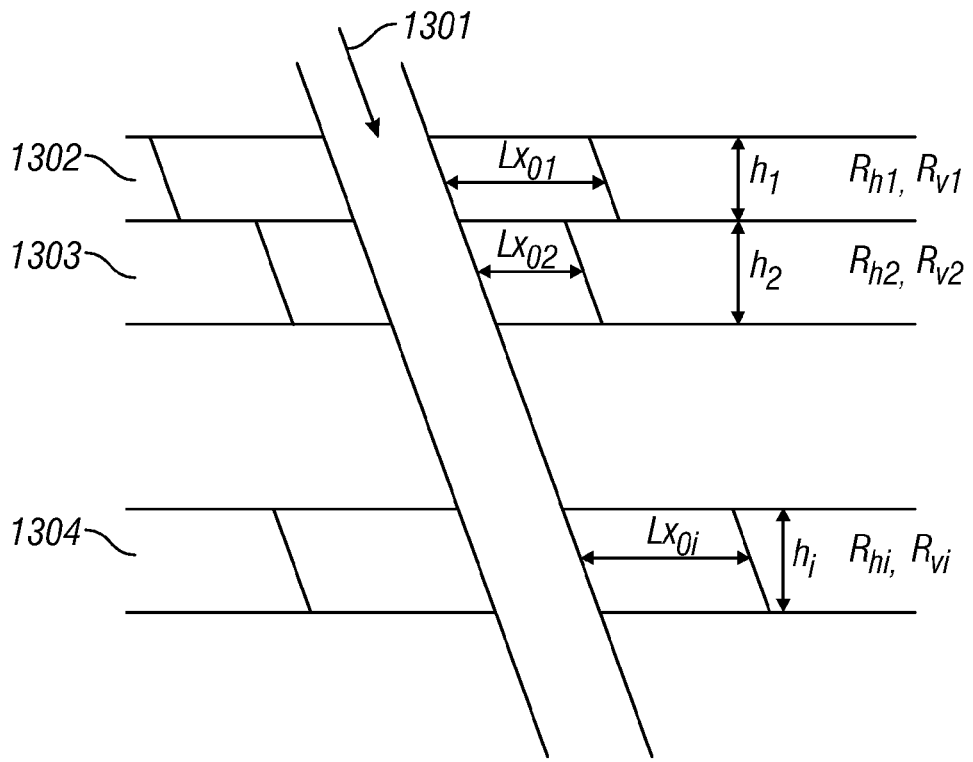
FIG. 11 shows a schematic cross section of a layered earth with a deviated borehole.

FIG. 11 is a schematic illustration of the model used in the present invention. The subsurface of the earth is characterized by a plurality of layers 1302, 1303, ..., 1304. The layers have thicknesses denoted by $h_1$, $h_2$, ... $h_i$. The horizontal and vertical resistivities in the layers are denoted by $R_{h1}$, $R_{h2}$, ... $R_{hi}$ and $R_{v1}$, $R_{v2}$, ... $R_{vi}$ respectively. Equivalently, the model may be defined in terms of conductivities (reciprocal of resistivity). The borehole is indicated by 1301 and associated with each of the layers are invaded zones in the vicinity of the borehole wherein borehole fluid has invaded the formation and altered is properties so that the electrical properties are not the same as in the uninvaded portion of the formation. The invaded zones have lengths $L_{xo1}$, $L_{xo2}$, ... $L_{xoi}$ extending away from the borehole. The resistivities in the invaded zones are altered to values $R_{xo1}$, $R_{xo2}$, ... $R_{xoi}$. It should further be noted that the discussion of the invention herein may be made in terms of resistivities or conductivities (the reciprocal of resistivity). The z-component of the 3DEX™ tool is oriented along the borehole axis and makes an angle θ (not shown) with the normal to the bedding plane. For the purposes of reservoir navigation, the borehole axis is almost parallel to the bedding plane. Assuming that the anisotropy axis is normal to the bedding, determination of the inclination of the tool axis to the anisotropy axis can then be used for reservoir navigation.

Determination of the relative dip angle is discussed next. The conductivity tensor of a horizontally layered formation with transversely anisotropic conductivity in each layer can be described using the matrix:

$$\hat{\sigma} = \begin{pmatrix} \sigma_h & 0 & 0 \\ 0 & \sigma_h & 0 \\ 0 & 0 & \sigma_v \end{pmatrix}. \quad (20)$$

where $\sigma_h$ is the formation conductivity in the horizontal direction and $\sigma_v$ is the formation conductivity in the vertical direction. In contrast, at every depth, the multi-component induction logging tool acquires the following matrix of magnetic measurements $$\hat{H} = \begin{pmatrix} h_{xx} & h_{xy} & h_{xz} \\ h_{yx} & h_{yy} & h_{yz} \\ h_{zx} & h_{zy} & h_{zz} \end{pmatrix} \quad (21)$$

Not every element of the magnetic matrix Eq. (21) is non-zero—i.e. the tool may acquire less than 9 components. The actual number of transmitter-receiver components for which measurements are made may be designated by $n_1$. The number $n_1$ is greater than 1, so that measurements are made with a plurality of transmitter-receiver pairs. At every logging depth, the magnetic matrix of Eq. (21) is a function of a formation conductivities $\sigma_h$ and $\sigma_v$ and two angles: relative dip θ (an angle between the formation normal and the tool axis) and relative rotation φ (the angle between the x-oriented sensor and the plane containing the tool axis and formation normal). As discussed in prior art (see, for example, Tabarovsky et al., 2001, "Measuring formation anisotropy using multi-frequency processing of transverse induction measurements", SPE 71706), the relative dip θ and relative rotation angles φ can be further expressed using five quantities: formation dip and formation azimuth in the gravity reference system plus measured tool orientation angles DEV, RB, DAZ. A full description of the relation between the different angles is given in U.S. Pat. No. 6,643,589 to Zhang et al., having the same assignee as the present invention and the contents of which are fully incorporated herein by reference. It should be noted that the matrix of measurements given by eq. (21) can be obtained using x-, y- and z-oriented transmitters and receivers as shown in FIG. 10. The same matrix can also be obtained by suitable rotation of coordinates of measurements made by other transmitter and receiver orientations, including those in which the transmitter and receiver axes are not orthogonal to each other or to the tool axis. In the present invention, when reference is made to the matrix of magnetic moments, it is intended to include data acquired with such non-orthogonal transmitter and receiver orientations.

Generally, the magnetic matrix Eq. (21) cannot be diagonalized in a deviated well. Even in a simple model, such as for a thick anisotropic layer, the magnetic matrix has non-zero off-diagonal components. The magnetic matrix is of the form:

$$\hat{H} = \begin{pmatrix} h_{xx} & 0 & h_{xz} \\ 0 & h_{yy} & 0 \\ h_{zx} & 0 & h_{zz} \end{pmatrix}. \quad (22)$$

MFFM as discussed above is applied to the magnetic matrix. In a general case, in a deviated well, the matrix of MFFM components has the following form:

$$\hat{H}_{MFF} = \begin{pmatrix} \tilde{h}_{xx} & \tilde{h}_{xy} & \tilde{h}_{xz} \\ \tilde{h}_{yx} & \tilde{h}_{yy} & \tilde{h}_{yz} \\ \tilde{h}_{zx} & \tilde{h}_{zy} & \tilde{h}_{zz} \end{pmatrix} \quad (23)$$

The focused multifrequency components are obtained by applying MFFM to measurements made at, say $n_2$ different frequencies. The number $n_2$ must be greater than 1 in order to accomplish MFFM. Thus, the $n_1$ components noted above are measured at a plurality of frequencies. Typically, the response of the multi-component induction tool is strongly affected by the near-borehole environment. When MFFM is applied, these near-borehole effects can be eliminated.

The matrix of MFFM components, Eq. (21), looks similar to the magnetic matrix of Eq. (19). Unlike single frequency measurements of Eq. (19), the tensor of the multi-frequency focused magnetic field of Eq. (21) can be diagonalized. It is shown below by a numerical example that the tensor of the focused multi-frequency magnetic field is diagonal in the coordinate system containing the formation normal:

$$\hat{H}_{MFFM} = \begin{pmatrix} \hbar_{xx} & 0 & 0 \\ 0 & \hbar_{xx} & 0 \\ 0 & 0 & \hbar_{zz} \end{pmatrix} \quad (22)$$

An equation of the form given by Eq. (22) therefore comprises two fundamental modes $\bar{h}_{xx}$ and $\bar{h}_{zz}$. Note that the off-diagonal terms are zero, and that the (x,x) and the (y,y) elements of the matrix are equal, just as they are in the conductivity tensor given by eq. (20). The value of the $\bar{h}_{xx}$ mode depends both on horizontal and vertical conductivity, while the $\bar{h}_{zz}$ mode depends only on horizontal conductivity.

The measured MFFM components of Eq. (23) are expressed in terms of the principal components $\bar{h}_{xx}$, $\bar{h}_{zz}$ of Eq. (24) and angles θ, φ using the relations:

$$\begin{pmatrix} \tilde{h}_{xx} \\ \tilde{h}_{xy} \\ \tilde{h}_{xz} \\ \tilde{h}_{yx} \\ \tilde{h}_{yy} \\ \tilde{h}_{yz} \\ \tilde{h}_{zx} \\ \tilde{h}_{zy} \\ \tilde{h}_{zz} \end{pmatrix} = \begin{pmatrix} c_\phi^2 c_\theta^2 + s_\phi^2 & c_\phi^2 s_\phi^2 \\ c_\varphi s_\varphi - c_\varphi s_\varphi c_\theta^2 & -c_\varphi s_\varphi s_\theta^2 \\ c_\varphi c_\theta s_\theta & -c_\varphi c_\theta s_\theta \\ c_\varphi s_\varphi - c_\varphi s_\varphi c_\theta^2 & -c_\varphi s_\varphi s_\theta^2 \\ s_\phi^2 c_\theta^2 + c_\varphi^2 & s_\phi^2 s_\varphi^2 \\ -s_\varphi c_\theta s_\theta & s_\varphi c_\theta s_\theta \\ c_\varphi c_\theta s_\theta & -c_\varphi c_\theta s_\theta \\ -s_\varphi c_\theta s_\theta & s_\varphi c_\theta s_\theta \\ s_\theta^2 & c_\theta^2 \end{pmatrix} \begin{pmatrix} \hbar_{xx} \\ \hbar_{zz} \end{pmatrix}, \quad (25)$$

where

θ is the relative inclination of the borehole axis to the normal to the bedding while φ is the azimuth. These angles are in the tool coordinate system. As noted above, Zhang et al. provides a description of the different coordinate systems, $s_\phi = \sin \phi$, $c_\phi = \cos \phi$, $s_\theta = \sin \theta$, $c_\theta = \cos \theta$.

Eq. (25) enables a calculation of the principal MFF components of Eq. (24). A typical method of solving Eq. (25) employs a least squares method. The obtained principal MFFM components $\bar{h}_{xx}$ and $\bar{h}_{zz}$ enable a sequential process for obtaining conductivity parameters. First, the horizontal conductivities can be determined from the $\bar{h}_{zz}$ component using the standard inversion methods of prior art, and then the vertical conductivity can be determined from the $\bar{h}_{xx}$ component and the horizontal conductivity, again using the standard inversion methods of prior art.

Figure 12:
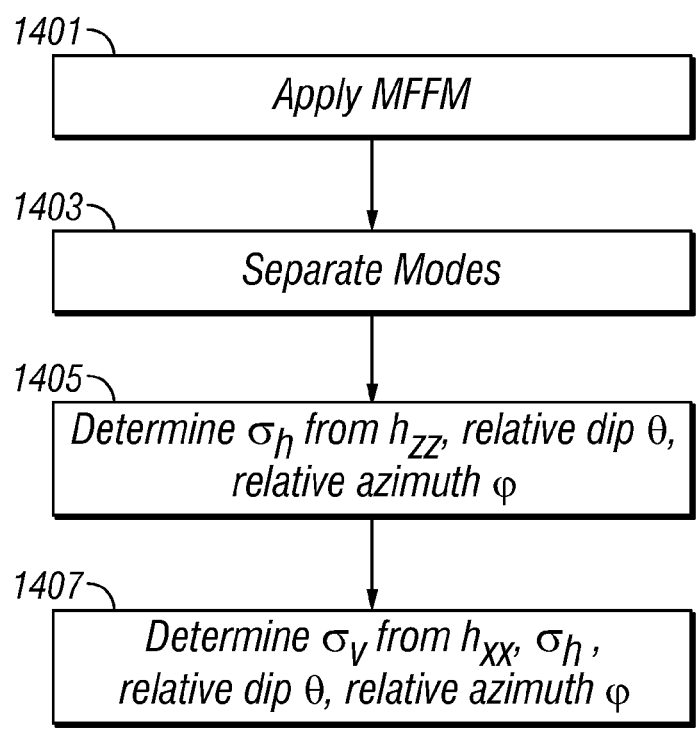
FIG. 12 is a flow chart illustrating one embodiment of the present invention.

FIG. 12 shows a flowchart of an exemplary embodiment of a first embodiment of the present invention. MFFM is applied using the 3DEX™ measurement tool (Box 1401). The obtained measurements are the components of the matrix of the left hand side of Eq. (23). If the angles θ and φ are known, separation of modes is then performed (Box 1403). Fundamental modes are typically the principal components $\bar{h}_{xx}$ and $\bar{h}_{zz}$ of the diagonalized multifrequency matrix. One way to separate the modes is by performing a least squares operation, for example, on Eq. (25). Acquisition of at least 2 or more independent components enable a solution of Eq. (25), having 2 unknown on its right-hand side. Thus, a requirement is that the number $n_1$ of focused measurements must be at least, or must be capable of giving two independent measurements. In Box 1405, knowledge of $\bar{h}_{zz}$ relative dip θ, and relative azimuth φ enables determination of the horizontal conductivity, $\sigma_h$ using the standard prior art inversion methods, such as that described in U.S. Pat. No. 6,636,045 to Tabarovsky et al. (Tabarovsky '045) incorporated herein by reference. Vertical conductivity $\sigma_v$ is then determined (Box 1407) using $\sigma_h$, relative dip θ and relative azimuth φ, again using the standard prior art methods such as that in Tabarovsky '045. Calculations can be made either uphole or downhole. Downhole computation might comprise use of a processor or expert system.

Figure 13:
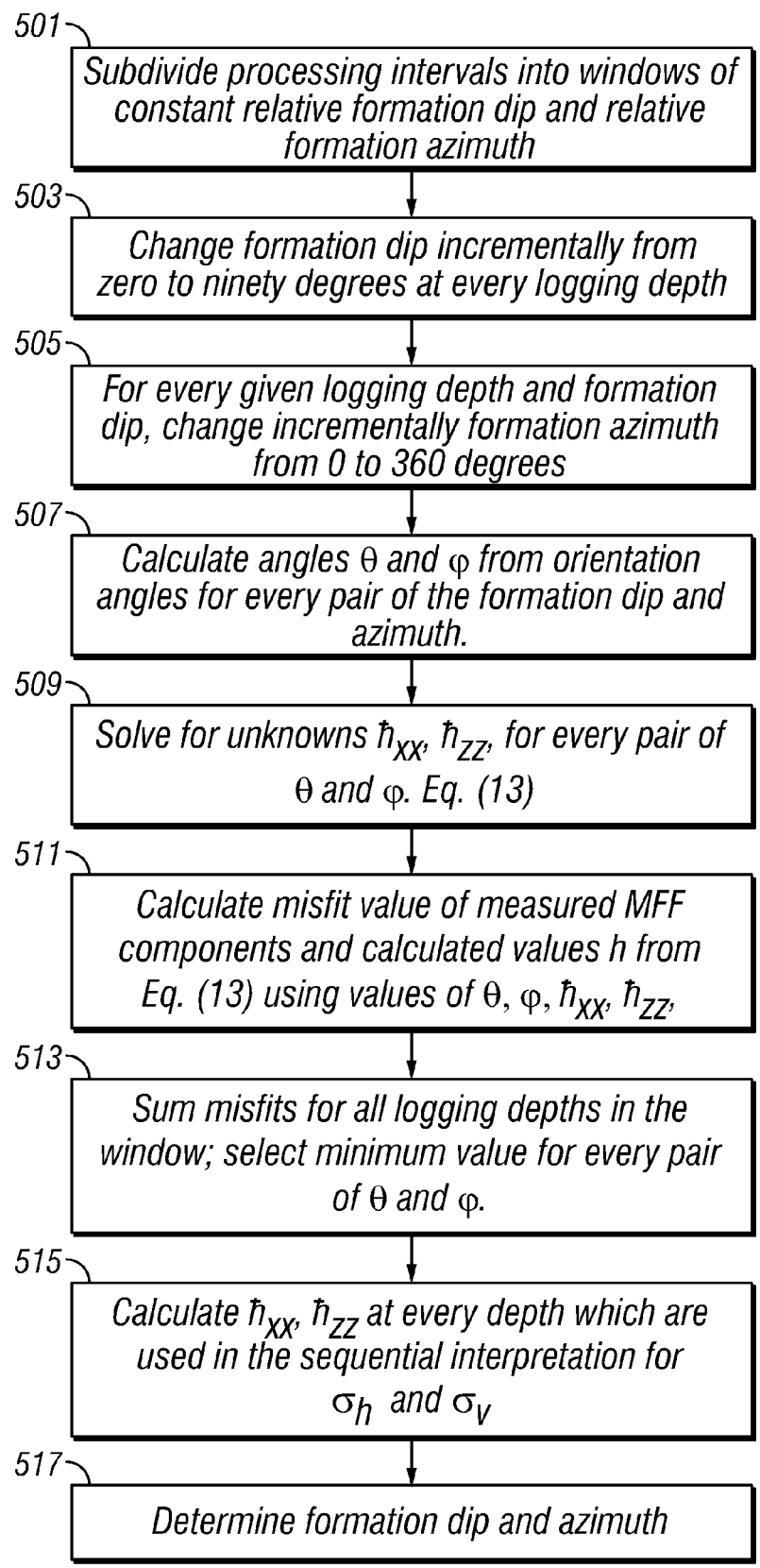
FIG. 13 is a flow chart illustrating a second embodiment of the present invention

FIG. 13 details an exemplary method of a second embodiment of the invention for recovering formation dip and formation azimuth given the obtained MFFM components. Formation angles are determined simultaneously with the principal components. This is different from the method disclosed in Tabarovsky '045 where an iterative process is used for determination of formation angles. In Box 1501, the entire processing interval is subdivided into relatively small windows in which values of the relative formation dip and relative formation azimuth within the windows are substantially constant. The term "relative" refers to the formation dip and azimuth in a wellbore based coordinate system. We denote these angles by Θ and Φ. As shown in Box 1503, a number of incremental values of relative formation dip are selected from a range, such as from zero to ninety degrees at every logging depth. At every given logging depth and formation dip, the relative formation azimuth is changed incrementally from 0 to 360 degrees. This change of relative formation azimuth is shown in Box 1505. In Box 1507, relative dip θ and relative azimuth φ in the tool coordinate system are calculated using the tool orientation angle. The relative dip θ in the tool coordinate system will be the same as the trial value of Θ. The tool orientation angle necessary for this calculation is obtained using suitable orientation sensors. For example, magnetometers may be used. In Box 1509, the system of Eq. (13) for unknown $\bar{h}_{xx}$ and $\bar{h}_{zz}$ can be solved for every pair of relative dip θ and relative azimuth φ in the tool coordinate system (and corresponding values of Θ and Φ in the borehole coordinate system). In Box 1511, the four obtained values of θ, φ, $\bar{h}_{xx}$, and $\bar{h}_{zz}$ can be substituted in Eq. (25), and calculations can be made of a misfit value. Typically, a misfit value can be calculated using a norm of the measured MFF components and of the values of ℏ components according to eq. (25). In Box 1513, for every pair of relative dip θ and relative azimuth φ (or alternately, for the formation dip and azimuth) the misfits can be summed at all logging depths in the window and a minimum value can be selected. The minimum value corresponds to a specific combination of $\Theta$ and $\Phi$. With the known $\theta$ and $\phi$ (or the formation dip and azimuth) $\bar{h}_{xx}$ and $\bar{h}_{zz}$ is calculated at every depth. The results of $\bar{h}_{xx}$ and $\bar{h}_{zz}$ are used in the sequential interpretation for $\sigma_h$ and $\sigma_v$, 1515 described in U.S. Pat. No. 6,574,562 to Tabarovsky et al. (Tabarovsky '562) incorporated herein by reference. An advantage of the present invention over Tabarovsky '045 is the ability to obtain angles simultaneously without using a time-consuming iterative procedure. In addition, unlike the method of Tabarovsky '045, an initial estimate of formation dip and formation azimuth relative to borehole axis is not necessary. At 1517, the absolute formation dip and azimuth in an earth coordinate system may be obtained using known values of borehole inclination and azimuth. Data regarding the borehole inclination and azimuth may be obtained from suitable survey sensors such as accelerometers and or gyroscopes.

The example given above was based on searching through a range of possible values of formation dip and azimuth in a borehole coordinate system. The method is equally applicable searching through a range of possible values of formation dip and azimuth in a fixed earth based coordinate system. The search could also be done in a tool-based coordinate system. Alternatively, any combination of coordinate systems may be used. The point to note is that angles are obtained simultaneously with resistivity parameters.

To illustrate the validity of the diagonalization procedure, a numerical example is presented. The specific example is a wireline example, but the method is equally applicable to MWD measurements. Single frequency and multi-frequency responses are calculated in a thick anisotropic layer with $\sigma_h$=1 S/m, $\sigma_v$=0.25 S/m. The angles of relative dip and relative rotation are, respectively, $\theta$=60°, $\phi$=30°. The principal components of the single frequency magnetic matrix (skin-effect corrected and normalized to apparent conductivity, in S/m) become $$\hat{H} = \begin{pmatrix} 0.496 & 0 & 0.99 \\ 0 & 0.678 & 0 \\ 0.99 & 0 & 1.03 \end{pmatrix}, \quad (26)$$

It is noted that in eq. (26), the terms $h_{xx}$ and $h_{yy}$ are not equal. In addition, $h_{xz}$ and $h_{zx}$ have significant non zero values.

In contrast, MFFM principal components normalized to apparent conductivity become $$\hat{H}_{MFF} = \begin{pmatrix} 0.572 & 0 & 0.019 \\ 0 & 0.580 & 0 \\ 0.019 & 0 & 0.973 \end{pmatrix}. \quad (27)$$

Numerical results, eq. (27), agree with the theoretical results within numerical accuracy of calculation of the MFF and skin-effect corrected components.

Another example illustrates the ability of the present invention to enable angle determination. To demonstrate use of the present invention for determining angles, as described above, the measurements of the 3DEX™ tool in a thick anisotropic layer are simulated with $\sigma_h$=1 S/m and $\sigma_v$=0.25 S/m for three different combinations of relative dip and relative rotation angles. The MFF transformation is applied to all five obtained magnetic field components and then the algorithm of FIG. 13 is executed. Table 1 presents the original relative dip and rotation angles and results of the processing.

TABLE 1

| | Model parameters | | | | Recovered parameters | | | |
|---|---|---|---|---|---|---|---|---|
| # | $\theta$ (deg) | $\phi$ (deg) | $\hbar_{xx}$(S/m) | $\hbar_{zz}$ (S/m) | $\theta$ (deg) | $\phi$ (deg) | $\hbar_{xx}$(S/m) | $\hbar_{zz}$ (S/m) |
| 1 | 40 | 30 | 0.576 | 0.973 | 39 | 30 | 0.570 | 0.971 |
| 2 | 54.73 | 45 | 0.576 | 0.973 | 53 | 44 | 0.576 | 0.965 |
| 3 | 70 | 80 | 0.576 | 0.973 | 70 | 80 | 0.578 | 0.960 |

The processing results agree very well with the original angles.

In one embodiment of the invention, reservoir navigation may be done by maintaining a fixed angle between the tool and the anisotropy axis. When the anisotropy is normal to the bedding plane, the fixed angle is 90°. If the angle is known to be different from 90° (for example, due to cross-bedding), then this value may be used for reservoir navigation. A particular situation in which navigation based on maintaining a fixed relative angle is useful is in drilling through a thick, homogenous shale formation. Such formations have electrical anisotropy but relatively few resistivity contrasts that can be used for navigation using prior art methods. Gyroscopic surveys are time consuming and expensive. The method of the present invention is able to give estimates in real time between the borehole axis and the anisotropy axis.

The principal components determined above may then also be used as a distance indicator to the interface. This has been discussed in Merchant et al. The cross-component xz signal gives the direction to the interface. As noted above, different frequency selections/expansion terms have their maximum sensitivity at different distances. Accordingly, in one embodiment of the invention, the frequency selection and the number of expansion terms is based on the desired distance from an interface in reservoir navigation. It should be noted that for purposes of reservoir navigation, it may not be necessary to determine an absolute value of formation resistivity: changes in the focused signal using the method described above are indicative of changes in the distance to the interface. The direction of drilling may be controlled by a second processor or may be controlled by the same processor that processes the signals. The computations for MFFM and the principal component separation may be done in real time, making the use of resistivity measurements suitable for reservoir navigation.

The processing of the data may be accomplished by a downhole processor. Implicit in the control and processing of the data is the use of a computer program implemented on a suitable machine readable medium that enables the processor to perform the control and processing. The machine readable medium may include ROMs, EPROMs, EAROMs, Flash Memories and Optical disks.

While the foregoing disclosure is directed to the preferred embodiments of the invention, various modifications will be apparent to those skilled in the art. It is intended that all such variations within the scope and spirit of the appended claims be embraced by the foregoing disclosure.

Appendix: Taylor's Frequency Series for MWD Electromagnetic Tool

We intend to evaluate the asymptotic behavior of magnetic field on the surface of a metal mandrel as described in Eq. (6):

$$H_\alpha(P) = H_\alpha^0(P) + \beta \int_S \{\vec{H}^{Ma}\vec{h}\}dS \tag{A1.1}$$

The primary and auxiliary magnetic fields, $H_\alpha^0$ and $^{Ma}\vec{h}$, depend only on formation parameters. The total magnetic field, $H_\alpha$, depends on both formation parameters and mandrel conductivity. The dependence on mandrel conductivity, $\sigma_c$, is reflected only in parameter $\beta$:

$$\beta = \frac{1}{k_c} = \frac{1}{\sqrt{-i\omega\mu\sigma_c}} \tag{A1.2}$$

The perturbation method applied to Eq. (A1.1) leads to the following result:

$$H_\alpha = \sum_{i=0}^{i=\infty} {}^{(i)}H_\alpha \tag{A1.3}$$

$$^{(0)}H_\alpha = H_\alpha^0 \tag{A1.4}$$

$$^{(i)}H_\alpha = \beta \int_S \{^{(i-1)}\vec{H}^{Ma}\vec{h}\}dS \tag{A1.5}$$

$$i = 1, \ldots, \infty$$

Let us consider the first order approximation that is proportional to the parameter $\beta$:

$$^{(1)}H_\alpha = \beta \int_S \{^{(0)}\vec{H}^{Ma}\vec{h}\}dS = \beta \int_S \{\vec{H}^{Ma}\vec{h}\}dS \tag{A1.6}$$

The integrand in Eq. (A1.6) does not depend on mandrel conductivity. Therefore, the integral in right-hand side, Eq. (A1.6), may be expanded in wireline-like Taylor series with respect to the frequency:

$$\int_S \{\vec{H}^{Ma}\vec{h}\}dS \approx b_0 + (-i\omega\mu)b_1 + (-i\omega\mu)^{3/2}b_{3/2} + (-i\omega\mu)^2 b_2 + \ldots \tag{A1.7}$$

In axially symmetric models, coefficients $b_j$ have the following properties:

$b_0$ does not depend on formation parameters. It is related to so called 'direct field';

$b_1$ is linear with respect to formation conductivity. It is related to Doll's approximation;

$b_{3/2}$ depends only on background conductivity and does not depend on near borehole parameters;

$b_2$ includes dependence on borehole and invasion.

Let us substitute Eq. (A1.7) into Eq. (A1.6):

$$^{(1)}H_\alpha = \frac{1}{\sqrt{\sigma_c}}\left(\frac{b_0}{(-i\omega\mu)^{1/2}} + (-i\omega\mu)^{1/2}b_1 + (-i\omega\mu)b_{3/2} + (-i\omega\mu)^{3/2}b_2 + \ldots\right) \tag{A1.8}$$

Eq. (A3.3), (A3.4), and (A3.8) yield:

$$H_\alpha \approx H_\alpha^0 + \frac{1}{\sqrt{\sigma_c}}\left(\frac{b_0}{(-i\omega\mu)^{1/2}} + (-i\omega\mu)^{1/2}b_1 + (-i\omega\mu)b_{3/2} + (-i\omega\mu)^{3/2}b_2 + \ldots\right) \tag{A1.9}$$

Collecting traditionally measured in MFF terms $\sim\omega^{3/2}$, we obtain:

$$(-i\omega\mu)^{3/2}(H_\alpha)_{3/2} \approx (-i\omega\mu)^{3/2}(H_\alpha^0)_{3/2} + \frac{(-i\omega\mu)^{3/2}b_2}{\sqrt{\sigma_c}} \tag{A1.10}$$

The first term in the right hand side, Eq. (A1.10), depends only on background formation. The presence of imperfectly conducting mandrel makes the MFF measurement dependent also on a near borehole zone parameters (second term, coefficient $b_2$) and mandrel conductivity, $\sigma_c$. This dependence, obviously, disappears for a perfect conductor ($\sigma_c \to \infty$). We should expect a small contribution from the second term since conductivity $\sigma_c$ is very large.

To measure the term $\sim\omega^{3/2}$, we can modify MFF transformation in such a way that contributions proportional to $1/(-i\omega\mu)^{1/2}$ and $(-i\omega\mu)^{1/2}$, Eq. (A1.9), are cancelled. We also can achieve the goal by compensating the term $\sim 1/(-i\omega\mu)^{1/2}$ in the air and applying MFF to the residual signal. The latter approach id preferable because it improves the MFF stability (less number of terms needs to be compensated). Let us consider a combination of compensation in the air and MFF in more detail. It follows from Eq. (A1.9) that the response in the air, $H_\alpha(\sigma=0)$, may be expressed in the following form:

$$H_\alpha(\sigma=0) \approx H_\alpha^0(\sigma=0) + \frac{1}{\sqrt{\sigma_c}}\left(\frac{b_0}{(-i\omega\mu)^{1/2}}\right) \tag{A1.11}$$

Compensation of the term $\sim b_0$, Eq. (A1.11), is important. Physically, this term is due to strong currents on the conductor surface and its contribution (not relating to formation parameters) may be very significant. Equations (A1.9) and (A1.11) yield the following compensation scheme:

$$H_\alpha - H_\alpha(\sigma=0) \approx (-i\omega\mu)(H_\alpha)_1 + (-i\omega\mu)^{3/2}(H_\alpha)_{3/2} + \frac{1}{\sqrt{\sigma_c}}((-i\omega\mu)^{1/2}b_1 + (-i\omega\mu)b_{3/2} + (-i\omega\mu)^{3/2}b_2 + \ldots) \tag{A1.12}$$

Considering measurement of imaginary component of the magnetic field, we obtain:

$$\text{Im}[H_\alpha - H_\alpha(\sigma=0)] \approx \quad (A1.13)$$

$$-\left\{ \frac{1}{\sqrt{\sigma_c}} \left(\frac{\omega\mu}{2}\right)^{1/2} b_1 + \omega\mu(H_\alpha)_1 + \left(\frac{\omega\mu}{2}\right)^{3/2}\left((H_\alpha)_{3/2} + \frac{b_2}{\sqrt{\sigma_c}}\right)\right\}$$

Equation (A1.13) indicates that in MWD applications, two frequency terms must be cancelled as opposed to only one term in wireline. Equation, (A1.4), modified for MWD applications has the following form:

$$\begin{pmatrix} H(\omega_1) \\ H(\omega_2) \\ \vdots \\ H(\omega_{m-1}) \\ H(\omega_m) \end{pmatrix} = \begin{pmatrix} \omega_1^{1/2} & \omega_1^1 & \omega_1^{3/2} & \omega_1^{5/2} & \cdots & \omega_1^{n/2} \\ \omega_2^{1/2} & \omega_2^1 & \omega_2^{3/2} & \omega_2^{5/2} & \cdots & \omega_2^{n/2} \\ \vdots & \vdots & \vdots & \vdots & \cdots & \vdots \\ \omega_{m-1}^{1/2} & \omega_{m-1}^1 & \omega_{m-1}^{3/2} & \omega_{m-1}^{5/2} & \cdots & \omega_{m-1}^{n/2} \\ \omega_m^{1/2} & \omega_m^1 & \omega_m^{3/2} & \omega_m^{5/2} & \cdots & \omega_m^{n/2} \end{pmatrix} \begin{pmatrix} s_{1/2} \\ s_1 \\ s_{3/2} \\ s_{5/2} \\ \vdots \\ s_{n/2} \end{pmatrix}. \quad (A1.14)$$

The residual signal (third term) depends on the mandrel conductivity but the examples considered in the report illustrate that this dependence is negligible due to very large conductivity of the mandrel. Similar approaches may be considered for the voltage measurements.

What is claimed is:

1. A method of evaluating an earth formation, the method comprising:

(a) conveying a bottomhole assembly (BHA) in a borehole in the earth formation, (b) using a logging tool on the BHA and obtaining multicomponent resistivity measurements at a plurality of frequencies, the multicomponent measurements depending in part on a horizontal resistivity and a vertical resistivity of the earth formation;

(c) determining from the multicomponent resistivity measurements a direction of a conductivity tensor, the determination accounting for a finite, nonzero conductivity of a body of the logging tool; and (d) recording the determined direction on a suitable medium.

2. The method of claim 1 further comprising controlling a direction of drilling of the BHA based on the determined direction.

3. The method of claim 1 wherein the multicomponent measurements are selected from the group consisting of (i) a $H_{xx}$ measurement, (ii) a $H_{xy}$ measurement, (iii) a $H_{xz}$ measurement, (iv) a $H_{yx}$ measurement, (v) a $H_{yy}$ measurement, (vi) a $H_{yz}$ measurement, (vii) a $H_{zx}$ measurement, (viii) a $H_{xy}$ measurement, and (ix) a $H_{zz}$ measurement.

4. The method of claim 1 wherein determining the direction of the conductivity tensor further comprises applying a multifrequency focusing to the multicomponent measurements at the plurality of frequencies.

5. The method of claim 3 wherein applying the multifrequency focusing further comprises using a Taylor series expansion of the form:

$$\begin{pmatrix} H(\omega_1) \\ H(\omega_2) \\ \vdots \\ H(\omega_{m-1}) \\ H(\omega_m) \end{pmatrix} = \begin{pmatrix} \omega_1^{1/2} & \omega_1^1 & \omega_1^{3/2} & \omega_1^{5/2} & \cdots & \omega_1^{n/2} \\ \omega_2^{1/2} & \omega_2^1 & \omega_2^{3/2} & \omega_2^{5/2} & \cdots & \omega_2^{n/2} \\ \vdots & \vdots & \vdots & \vdots & \cdots & \vdots \\ \omega_{m-1}^{1/2} & \omega_{m-1}^1 & \omega_{m-1}^{3/2} & \omega_{m-1}^{5/2} & \cdots & \omega_{m-1}^{n/2} \\ \omega_m^{1/2} & \omega_m^1 & \omega_m^{3/2} & \omega_m^{5/2} & \cdots & \omega_m^{n/2} \end{pmatrix} \begin{pmatrix} s_{1/2} \\ s_1 \\ s_{3/2} \\ s_{5/2} \\ \vdots \\ s_{n/2} \end{pmatrix}.$$

where the H's are measurements, $\omega$'s are frequencies, and s's are coefficients of the expansion.

6. The method of claim 3 wherein determining the direction of the conductivity tensor further comprises determining at least two fundamental modes from results of the multifrequency focusing.

7. The method of claim 6 wherein the determining the at least two fundamental modes further comprises solving an equation of the form:

$$\begin{pmatrix} \tilde{h}_{xx} \\ \tilde{h}_{xy} \\ \tilde{h}_{xz} \\ \tilde{h}_{yx} \\ \tilde{h}_{yy} \\ \tilde{h}_{yz} \\ \tilde{h}_{zx} \\ \tilde{h}_{zy} \\ \tilde{h}_{zz} \end{pmatrix} = \begin{pmatrix} c_\phi^2 c_\theta^2 + s_\varphi^2 & c_\phi^2 s_\varphi^2 \\ c_\varphi s_\varphi - c_\varphi s_\varphi c_\theta^2 & -c_\varphi s_\varphi s_\theta^2 \\ c_\varphi c_\theta s_\theta & -c_\varphi c_\theta s_\theta \\ c_\varphi s_\varphi - c_\varphi s_\varphi c_\theta^2 & -c_\varphi s_\varphi s_\theta^2 \\ s_\phi^2 c_\theta^2 + c_\varphi^2 & s_\phi^2 s_\varphi^2 \\ -s_\varphi c_\theta s_\theta & s_\varphi c_\theta s_\theta \\ c_\varphi c_\theta s_\theta & -c_\varphi c_\theta s_\theta \\ -s_\varphi c_\theta s_\theta & s_\varphi c_\theta s_\theta \\ s_\theta^2 & c_\theta^2 \end{pmatrix} \begin{pmatrix} \tilde{h}_{xx} \\ \tilde{h}_{zz} \end{pmatrix}$$

where $\theta$ is the relative angle, $\phi$ is an azimuth in a tool coordinate system, $s_\phi = \sin \phi$, $c_\phi = \cos \phi$, $s_\theta = \sin \theta$, $c_\theta = \cos \theta$, and $\tilde{h}_{xx}$ and $\tilde{h}_{zz}$ are the at least two fundamental modes.

8. The method of claim 6 further comprising determining from one of the at least two fundamental modes an estimate of the horizontal conductivity of the earth formation.

9. The method of claim 8 further comprising determining from another of the at least two fundamental modes and the estimate of the horizontal conductivity an estimate of the vertical conductivity of the earth formation.

10. The method of claim 1 wherein the earth formation comprises a shale with substantially no resistivity contrasts within.

11. The method of claim 2 wherein controlling the drilling direction comprises one of (i) maintaining the direction to be substantially parallel to an interface in the earth formation, and (ii) maintaining the direction at a value determined by a cross-bedding angle in the earth formation.

12. An apparatus for evaluating an earth formation, the apparatus comprising:

(a) a bottomhole assembly (BHA) configured to be conveyed in a borehole in the earth formation, (b) a logging tool on the BHA configured to obtain multi-component resistivity measurements at a plurality of frequencies, the multicomponent measurements depending at least in part on a horizontal resistivity and a vertical resistivity of the earth formation; and (c) at least one processor configured to:

(A) determine from the multicomponent measurements a direction of a conductivity tensor, the determination accounting for a finite, nonzero conductivity of a body of the logging tool; and (B) record the determined direction on a suitable medium.

13. The apparatus of claim 12 wherein the at least one processor is further configured to control a direction of drilling of the BHA based on the determined direction.

14. The apparatus of claim 12 wherein the multicomponent measurements are selected from the group consisting of (i) a $H_{xx}$ measurement, (ii) a $H_{xy}$ measurement, (iii) a $H_{xz}$ measurement, (iv) a $H_{yx}$ measurement, (v) a $H_{yy}$ measurement, (vi) a $H_{yz}$ measurement, (vii) a $H_{zx}$ measurement, (viii) a $H_{xy}$ measurement, and (ix) a $H_{zz}$ measurement.

15. The apparatus of claim 12 wherein the at least one processor is further configured to determine the direction by applying a multifrequency focusing to the multicomponent measurements at the plurality of frequencies.

16. The apparatus of claim 15 wherein the at least one processor is further configured to determine the direction by determining at least two fundamental modes to results of the multifrequency focusing.

17. The apparatus of claim 15 wherein the at least one processor is further configured to determine the at least two fundamental modes by solving an equation of the form:

$$\begin{pmatrix} \tilde{h}_{xx} \\ \tilde{h}_{xy} \\ \tilde{h}_{xz} \\ \tilde{h}_{yx} \\ \tilde{h}_{yy} \\ \tilde{h}_{yz} \\ \tilde{h}_{zx} \\ \tilde{h}_{zy} \\ \tilde{h}_{zz} \end{pmatrix} = \begin{pmatrix} c_\phi^2 c_\theta^2 + s_\phi^2 & c_\phi^2 s_\theta^2 \\ c_\varphi s_\varphi - c_\varphi s_\varphi c_\theta^2 & -c_\varphi s_\varphi s_\theta^2 \\ c_\varphi c_\theta s_\theta & -c_\varphi c_\theta s_\theta \\ c_\varphi s_\varphi - c_\varphi s_\varphi c_\theta^2 & -c_\varphi s_\varphi s_\theta^2 \\ s_\phi^2 c_\theta^2 + c_\varphi^2 & s_\phi^2 s_\varphi^2 \\ -s_\varphi c_\theta s_\theta & s_\varphi c_\theta s_\theta \\ c_\varphi c_\theta s_\theta & -c_\varphi c_\theta s_\theta \\ -s_\varphi c_\theta s_\theta & s_\varphi c_\theta s_\theta \\ s_\theta^2 & c_\theta^2 \end{pmatrix} \begin{pmatrix} \hbar_{xx} \\ \hbar_{zz} \end{pmatrix}$$

where

θ is the relative angle,

φ is an azimuth in a tool coordinate system, $s_\phi = \sin \phi$, $c_\phi = \cos \phi$, $s_\theta = \sin \theta$, $c_\theta = \cos \theta$, $\bar{h}_{xx}$ and $\bar{h}_{zz}$ are the at least two fundamental modes.

18. The apparatus of claim 15 wherein the at least one processor is further configured to determine from one of the at least two fundamental modes an estimate of the horizontal conductivity of the earth formation.

19. The apparatus of claim 15 wherein the at least one processor is further configured to determine from another of the at least two fundamental modes and the estimate of the horizontal conductivity an estimate of the vertical conductivity of the earth formation.

20. The apparatus of claim 12 further comprising a drilling tubular which conveys the BHA into the borehole.

21. A computer readable medium for use with an apparatus for evaluating an earth formation, the apparatus including:

(a) a bottomhole assembly (BHA) having a drillbit thereon configured to drill a borehole in the earth formation, (b) a logging tool on the BHA configured to obtain multi-component resistivity measurements at a plurality of frequencies, the multicomponent measurements depending at least in part on a horizontal resistivity and a vertical resistivity of the earth formation;

the medium comprising instructions that when executed by a processor:

(c) determine a direction of a conductivity tensor of the earth formation based on the multicomponent measurements, the determination accounting for a finite, nonzero conductivity of a body of the logging tool; and (d) record the determined direction on a suitable medium.

22. The medium of claim 21 further comprising instructions that when executed by a computer:

(i) apply multifrequency focusing to the multicomponent measurements, and (ii) determine at least two fundamental modes from results of the multifrequency focusing.

23. The medium of claim 21 wherein the medium comprises at least one of the set consisting of (i) a ROM, (ii) an EPROM, (iii) an EAROM, (iv) a Flash Memory, and, (v) an Optical disk.

* * * * *